(12) United States Patent
Tsunoda

(10) Patent No.: US 12,470,299 B2
(45) Date of Patent: Nov. 11, 2025

(54) OPTICAL TRANSMITTER THAT INCLUDES OPTICAL MODULATOR

(71) Applicant: Fujitsu Limited, Kawasaki (JP)

(72) Inventor: Yukito Tsunoda, Sagamihara (JP)

(73) Assignee: Fujitsu Limited, Kawasaki (JP)

( * ) Notice: Subject to any disclaimer, the term of this patent is extended or adjusted under 35 U.S.C. 154(b) by 296 days.

(21) Appl. No.: 18/187,058

(22) Filed: Mar. 21, 2023

(65) Prior Publication Data

US 2024/0014905 A1 Jan. 11, 2024

(30) Foreign Application Priority Data

Jul. 6, 2022 (JP) .................. 2022-108925

(51) Int. Cl.
*H04B 10/548* (2013.01)
(52) U.S. Cl.
CPC ................... *H04B 10/548* (2013.01)
(58) Field of Classification Search
CPC .................................................. H04B 10/548
See application file for complete search history.

(56) References Cited

U.S. PATENT DOCUMENTS

| | | | |
|---|---|---|---|
| 2007/0103186 A1 | 5/2007 | Clements et al. | |
| 2012/0114067 A1* | 5/2012 | Tsunoda | H04L 25/03343 375/295 |
| 2014/0140708 A1* | 5/2014 | Tsunoda | H04B 10/588 398/192 |
| 2017/0289654 A1* | 10/2017 | Zhang | H04Q 11/00 |
| 2019/0094648 A1* | 3/2019 | Williams | G02F 1/2255 |
| 2019/0296830 A1* | 9/2019 | Kucharski | H04B 10/0795 |
| 2022/0131616 A1* | 4/2022 | Reed | H04B 10/54 |

FOREIGN PATENT DOCUMENTS

| | | | |
|---|---|---|---|
| JP | 2006191355 A | * | 7/2006 |
| JP | 2007-124644 | | 5/2007 |
| JP | 2012-104953 | | 5/2012 |
| JP | 2017-219587 | | 12/2017 |

OTHER PUBLICATIONS

Huynh et al., "Flexible Transmitter Employing Silicon-Segmented Mach-Zehnder Modulator With 32 nm CMOS Distributed Driver", JLT vol. 34 No. Nov. 22, 15, 2016, p. 5129-5136.

* cited by examiner

*Primary Examiner* — Pranesh K Barua
(74) *Attorney, Agent, or Firm* — STAAS & HALSEY LLP

(57) ABSTRACT

An optical transmitter includes: an optical modulator that includes a Mach-Zehnder interferometer, a first phase shift segment, and a second phase shift segment, the first phase shift segment and the second phase shift segment each being configured to shift a phase of light propagating through an optical path of the Mach-Zehnder interferometer; and a drive circuit that generates a signal for driving the optical modulator. The drive circuit includes: a first circuit that generates a first electric signal from an input signal indicating transmission data; and a second circuit that generates a second electric signal that emphasizes an edge of the first electric signal based on the input signal. The drive circuit provides the first electric signal to the first phase shift segment and provides the second electric signal to the second phase shift segment.

10 Claims, 20 Drawing Sheets

USE BAND OF DATA SIGNAL

USE BAND OF EMPHASIS COMPONENT

OPTICAL TRANSMITTER THAT INCLUDES OPTICAL MODULATOR

CROSS-REFERENCE TO RELATED APPLICATION

This application is based upon and claims the benefit of priority of the prior Japanese Patent Application No. 2022-108925, filed on Jul. 6, 2022, the entire contents of which are incorporated herein by reference.

FIELD

The embodiments discussed herein are related to an optical transmitter that performs pre-emphasis on a drive signal for driving an optical modulator.

BACKGROUND

In order to realize high-quality optical communication, it is required that a waveform of an optical signal transmitted from an optical transmitter is good. Optical transmitters in many cases include Mach-Zehnder modulators. In this case, a modulated optical signal is generated by giving a drive signal generated from a data signal to the Mach-Zehnder modulator.

In order to transmit a large amount of data, it is necessary to increase the speed of the drive signal. However, there is a limit to increasing the speed of the electric signal, and the waveform of the drive signal may be deteriorated. Specifically, the waveform of the drive signal is rounded. Therefore, an optical transmitter for high-speed data communication may include a circuit that performs pre-emphasis on a drive signal.

A circuit that generates an emphasized signal is described in, for example, Japanese Laid-open Patent Publication No. 2012-104953 or Japanese Laid-open Patent Publication No. 2007-124644. Optical transmitters utilizing pre-emphasis are described, for example, in Japanese Laid-open Patent Publication No. 2017-219587 or Huynh et al., Flexible Transmitter Employing Silicon-Segmented Mach-Zehnder Modulator With 32 nm CMOS Distributed Driver, JLT Vol. 34 No. 22 p. 5129-5136.

As described above, optical transmitters having a pre-emphasis circuit are known. However, in the prior art, power consumption for pre-emphasis is large.

SUMMARY

According to an aspect of the embodiments, an optical transmitter includes: an optical modulator that includes a Mach-Zehnder interferometer, a first phase shift segment, and a second phase shift segment, the first phase shift segment and the second phase shift segment each being configured to shift a phase of light propagating through an optical path of the Mach-Zehnder interferometer; and a drive circuit that generates a signal for driving the optical modulator. The drive circuit includes: a first circuit that generates a first electric signal from an input signal indicating transmission data; and a second circuit that generates a second electric signal that emphasizes an edge of the first electric signal based on the input signal. The drive circuit provides the first electric signal to the first phase shift segment and provides the second electric signal to the second phase shift segment.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
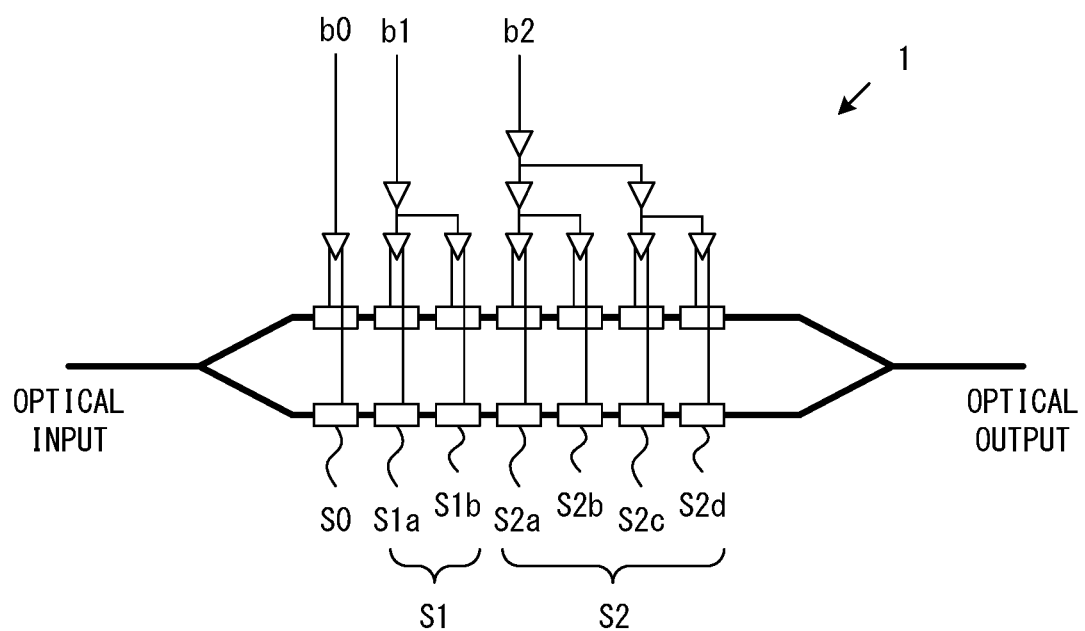
FIG. 1 illustrates an example of an optical modulator included in an optical transmitter according to an embodiment of the present invention.

FIG. 1 illustrates an example of an optical modulator included in an optical transmitter according to an embodiment of the present invention. In this example, an optical modulator 1 generates a modulated optical signal in which each symbol transmits n bits. Therefore, n drive signals are provided to the optical modulator 1. In the example illustrated in FIG. 1, n is 3. Specifically, drive signals b0 to b2 are provided to the optical modulator 1. Each of the drive signals b0 to b2 is, for example, a non return to zero (NRZ) signal. The drive signals b0 to b2 are differential signals.

The optical modulator 1 is realized by a Mach-Zehnder modulator including a Mach-Zehnder interferometer. The Mach-Zehnder interferometer includes an input waveguide, a pair of arm waveguides, and an output waveguide. Each arm waveguide is provided with a signal electrode for receiving a drive signal. Specifically, electrodes S0 to S2 are provided for the bits b0 to b2, respectively. Here, when one electrode S0 is provided for the bit b0, two electrodes S1a to S1b are provided for the bit b1, and four electrodes S2a to S2d are provided for the bit b2. In this case, the lengths of the electrodes S0, S1a to S1b, and S2a to S2d are the same. In the following description, each electrode may be referred to as a "segment".

Continuous wave light is input to the optical modulator 1. The continuous wave light propagates through the pair of arm waveguides. At this time, the phase of the light passing through the arm waveguide changes according to the electric signal provided to each segment. That is, each segment works as a phase shift segment that shifts the phase of the light propagating through the optical path of the Mach-Zehnder interferometer. Here, the number of segments provided for the bit b1 is twice the number of segments provided for the bit b0, and the number of segments provided for the bit b2 is four times the number of segments provided for the bit b0. With this configuration, the optical modulator 1 can generate a pulse amplitude modulation (PAM) 8 optical signal corresponding to the values of the drive signals b0 to b2. As described above, the optical modulator 1 generates the modulated optical signal from the digital signal (drive signals b0 to b2) indicating the transmission data. Therefore, the optical modulator 1 having the configuration illustrated in FIG. 1 may be referred to as an "optical digital-to-analog converter (DAC) modulator" or an "optical DAC transmitter".

Figure 2A:
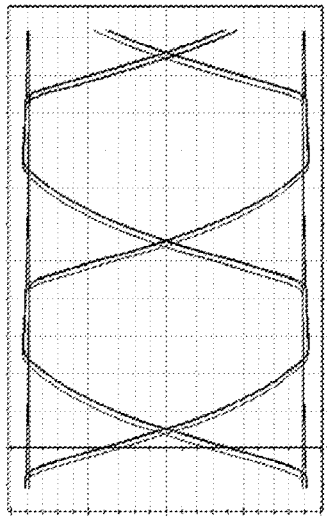
FIGS. 2A and 2B are diagrams for explaining deterioration of an optical waveform due to high-speed data.
Figure 2A:
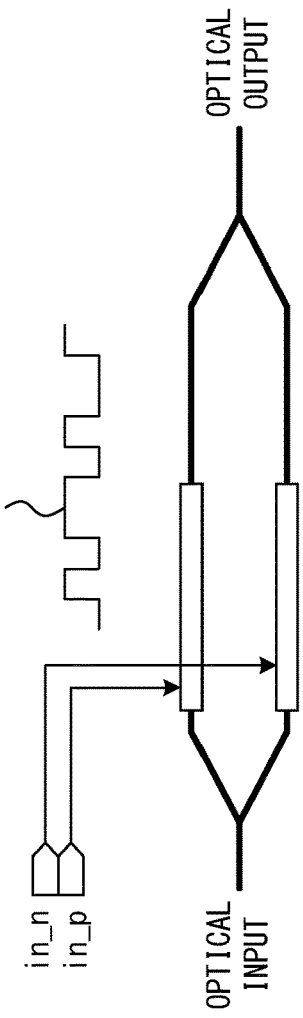
Figure 2B:
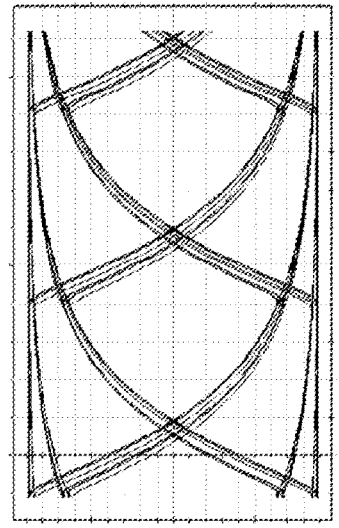
Figure 2B:
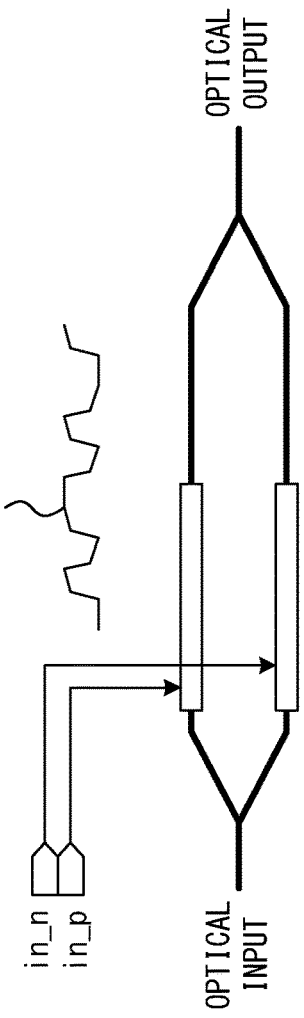

FIGS. 2A and 2B are diagrams for explaining deterioration of an optical waveform due to high-speed data. In FIGS. 2A and 2B, one of a plurality of segments provided in the optical modulator illustrated in FIG. 1 is illustrated. The drive signal is an NRZ differential signal.

When the drive signal is not deteriorated, as illustrated in FIG. 2A, the waveform of the optical signal output from the optical modulator is good. That is, an optical signal having a large eye opening is generated.

However, there is a limit to increasing the speed of the electric signal. Therefore, the waveform of the drive signal may be deteriorated. Specifically, the waveform of the drive signal is rounded. When the deteriorated drive signal is provided to the optical modulator, the waveform of the optical signal output from the optical modulator also deteriorates as illustrated in FIG. 2B. For example, the eye opening is narrowed. Therefore, pre-emphasis for adjusting the waveform of the drive signal is performed.

Figure 3A:
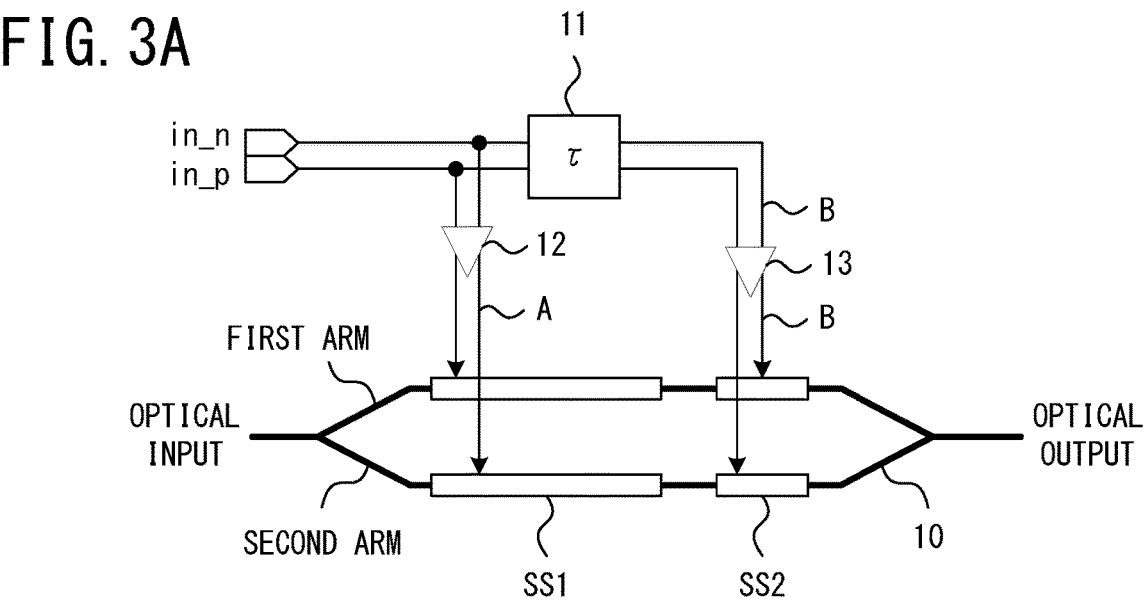
FIGS. 3A and 3B illustrate an example of a drive circuit having a pre-emphasis function.

FIG. 3A illustrates an example of a drive circuit having a pre-emphasis function. In this example, as illustrated in FIG. 3A, each segment provided in the arm waveguide of the optical modulator 10 includes two sub-segments (SS1 and SS2).

An amplifier 12 amplifies an input signal to generate a signal A. The signal A is provided to the sub-segment SS1. A delay circuit 11 delays the input signal by a specified time. Then, a delay signal B output from the delay circuit 11 is amplified by an amplifier 13 and provided to the sub-segment SS2.

The delay signal B is provided to the optical modulator 10 in an inverted state with respect to the signal A. That is, the inverted delay signal B is provided to the optical modulator 10. Specifically, when a non-inverted signal (p) and an inverted signal (n) constituting the signal A are provided to a first arm and a second arm, respectively, a non-inverted signal (p) and an inverted signal (n) constituting the delay signal B are provided to the second arm and the first arm, respectively. Therefore, the optical modulator 10 is driven by the signal A and the inverted delay signal B.

Figure 3B:
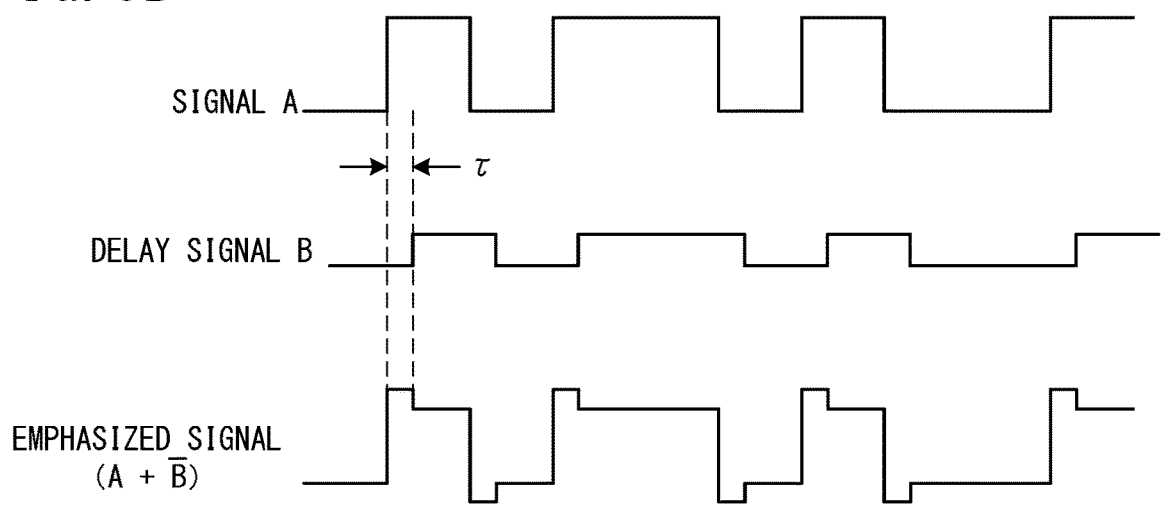

FIG. 3B is a timing chart of signals provided to the optical modulator 10 illustrated in FIG. 3A. Note that this timing chart illustrates one of a set of signals constituting a differential signal.

The signal A is an NRZ signal indicating transmission data. The delay signal B is delayed from the signal A by a time τ. Here, in order to simplify the description, it is assumed that the delay generated in the amplifier 12 and the amplifier 13 is ignored. Then, the signal A and the inverted delay signal B are applied to the optical modulator 10. In this case, the electric signal applied to the optical modulator 10 has an overshoot at the rising edge and an undershoot at the falling edge. That is, the rising edge and the falling edge are emphasized. Therefore, deterioration (for example, waveform rounding) of the waveform of the electric signal is compensated for, and an optical signal having a good waveform is generated in the optical modulator 10.

In this manner, by adding the inverted delay signal B to the signal A, a drive signal in which an edge is emphasized is obtained. Therefore, a signal obtained by adding the inverted delay signal B to the signal A may be referred to as an "emphasized signal". In the following description, the configuration illustrated in FIG. 3A may be referred to as a "sample configuration".

According to the drive circuit described above (that is, the sample configuration illustrated in FIG. 3A), the deterioration of the waveform of the electric signal that drives the optical modulator is compensated for. However, in the sample configuration, the power consumption of the drive circuit increases.

EMBODIMENTS

Figure 4A:
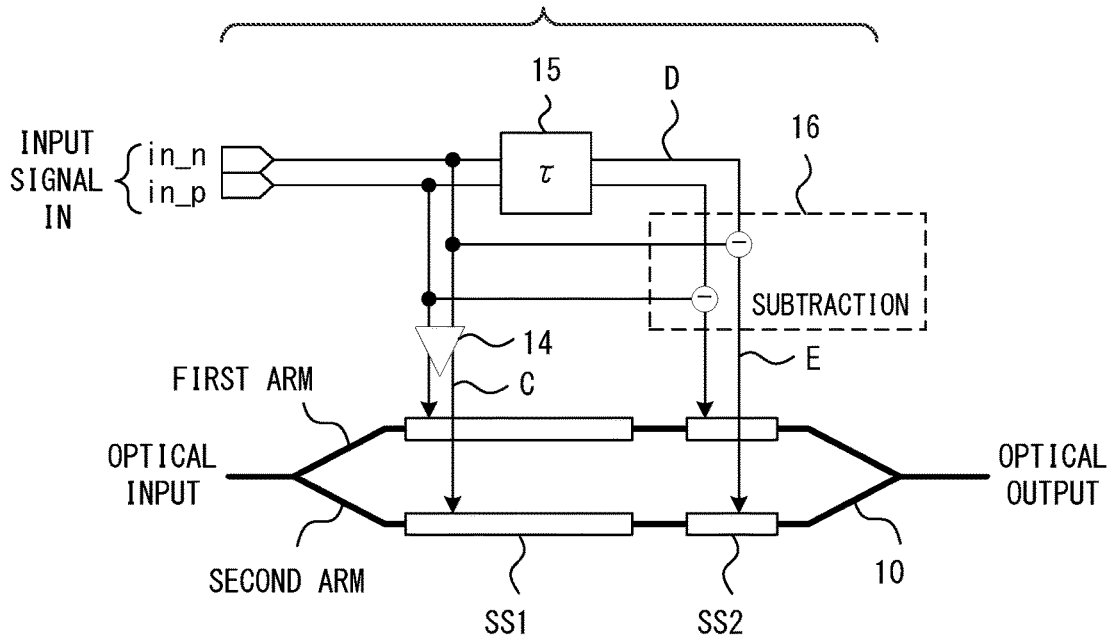
FIGS. 4A and 4B illustrate an example of an optical modulator and the drive circuit thereof according to the embodiment of the present invention.

FIG. 4A illustrates an example of an optical modulator and a drive circuit thereof according to an embodiment of the present invention. Similarly to FIG. 3A, FIG. 4A illustrates any one of a plurality of segments provided in the optical modulator illustrated in FIG. 1. An optical modulator 10 has the same sample configuration as that illustrated in FIG. 3A. That is, the optical modulator 10 includes a Mach-Zehnder interferometer. In addition, the optical modulator 10 includes a sub-segment SS1 and a sub-segment SS2 that shift the phase of light propagating through the optical path of the Mach-Zehnder interferometer.

The drive circuit 100 includes a first circuit that generates a first electric signal from an input signal indicating transmission data, and a second circuit that generates a second electric signal for enhancing an edge of the first electric signal based on the input signal. In the example illustrated in FIG. 4A, the first circuit is realized by an amplifier 14. That is, the amplifier 14 amplifies an input signal IN to generate a drive signal C. In the example illustrated in FIG. 4A, the second circuit is realized by a delay circuit 15 and a subtractor circuit 16.

The delay time T of the delay circuit 15 is shorter than a cycle period (alternatively, a symbol time of a modulated optical signal generated by the optical modulator 10) of the input signal IN indicating the transmission data. Furthermore, an amplitude of a delay signal D output from the delay circuit 15 is, for example, the same as an amplitude of the input signal IN. The subtractor circuit 16 subtracts the delay signal D from the input signal IN. At this time, a non-inverted signal and an inverted signal constituting the delay signal D are subtracted from a non-inverted signal (in_p) and an inverted signal (in_n) constituting the input signal IN, respectively. Here, a signal obtained by subtracting the delay signal D from the input signal IN corresponds to an emphasis component that emphasizes an edge of the drive signal C, which will be described later. Therefore, in the following description, the output signal of the subtractor circuit 16 may be referred to as an "emphasis component signal E".

The drive circuit 100 provides the drive signal C to the sub-segment SS1 and provides the emphasis component signal E to the sub-segment SS2. Therefore, the phase of the light passing through the optical modulator 10 is controlled by both the drive signal C and the emphasis component signal E. At this time, the emphasis component signal E is provided to the optical modulator 10 without being inverted with respect to the drive signal C. Specifically, when a non-inverted signal and an inverted signal constituting the drive signal C are provided to the first arm and the second arm, respectively, a non-inverted signal and an inverted signal constituting the emphasis component signal E are also provided to the first arm and the second arm, respectively. Therefore, the optical modulator 10 is driven by the drive signal C and the emphasis component signal E. In other words, the optical modulator 10 is driven by the drive signal C to which the emphasis component signal E is added.

Figure 4B:
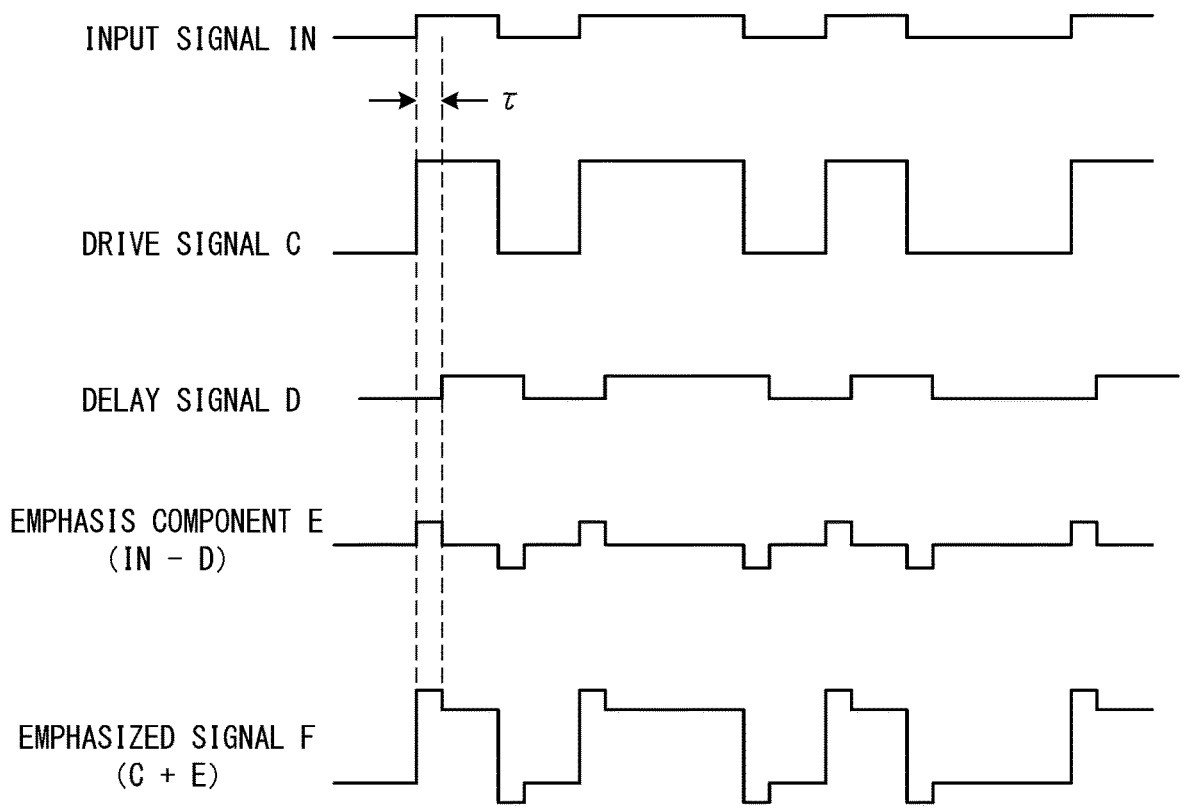

FIG. 4B is a timing chart of signals generated by the drive circuit 100 illustrated in FIG. 4A. Note that this timing chart illustrates one of a set of signals constituting a differential signal.

The input signal IN is an NRZ signal indicating transmission data. The amplifier 14 generates the drive signal C by amplifying the input signal IN. Here, in order to simplify the description, it is assumed that the delay time of the amplifier 14 is ignored. That is, it is assumed that the timing of the edge of the drive signal C is the same as the timing of the edge of the input signal IN.

The delay signal D is delayed by a time τ with respect to the input signal IN or the drive signal C. Then, the emphasis component signal E is generated by subtracting the delay signal D from the input signal IN in the subtractor circuit 16. Therefore, the emphasis component signal E has a pulse immediately after the edge of the drive signal C. Specifically, the emphasis component signal E has a positive pulse immediately after the rising edge of the drive signal C and a negative pulse immediately after the falling edge of the drive signal C. The width of each pulse corresponds to the delay time τ.

The drive signal C and the emphasis component signal E are provided to the optical modulator 10. That is, the optical modulator 10 is driven by the drive signal C to which the emphasis component signal E is added. Here, when the emphasis component signal E is added to the drive signal C, a drive signal in which an edge is emphasized is obtained. In the following description, an electric signal obtained by adding the emphasis component signal E to the drive signal C may be referred to as an "emphasized signal F".

As compared with the drive signal C, the emphasized signal F has an overshoot component at the rising edge and an undershoot component at the falling edge. Therefore, the deterioration (for example, waveform rounding) of the waveform of the electric signal due to the high-speed data is compensated for, and an optical signal having a good waveform is generated in the optical modulator 10.

The amplitude of the emphasis component signal E may be determined according to the degree of the deterioration of the electric signal waveform, for example. In this case, when the deterioration of the electric signal waveform is severe, the amplitude of the emphasis component signal E may be increased. Note that the amplitude of the emphasis component signal E can be adjusted, for example, by controlling a current flowing through a transistor constituting the subtractor circuit 16.

As described above, the drive circuit 100 according to the embodiment of the present invention can generate an emphasized signal similar to that of the drive circuit having the sample configuration illustrated in FIG. 3A. However, the power consumption of the drive circuit 100 is reduced as compared with the drive circuit having the sample configuration. Hereinafter, reduction in power consumption of the drive circuit 100 will be described.

Figure 5A:
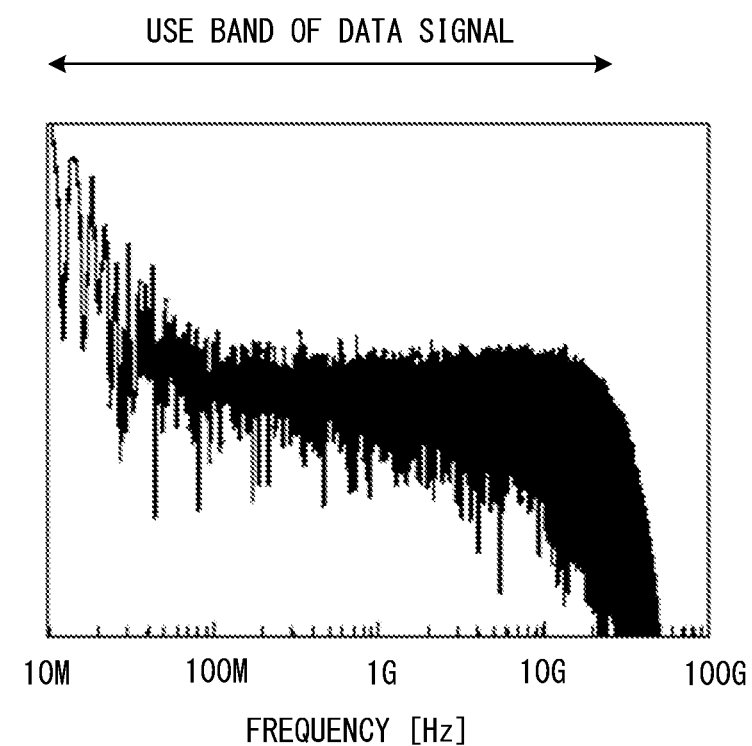
FIGS. 5A and 5B illustrate frequency characteristics of signals in the drive circuit.
Figure 5B:
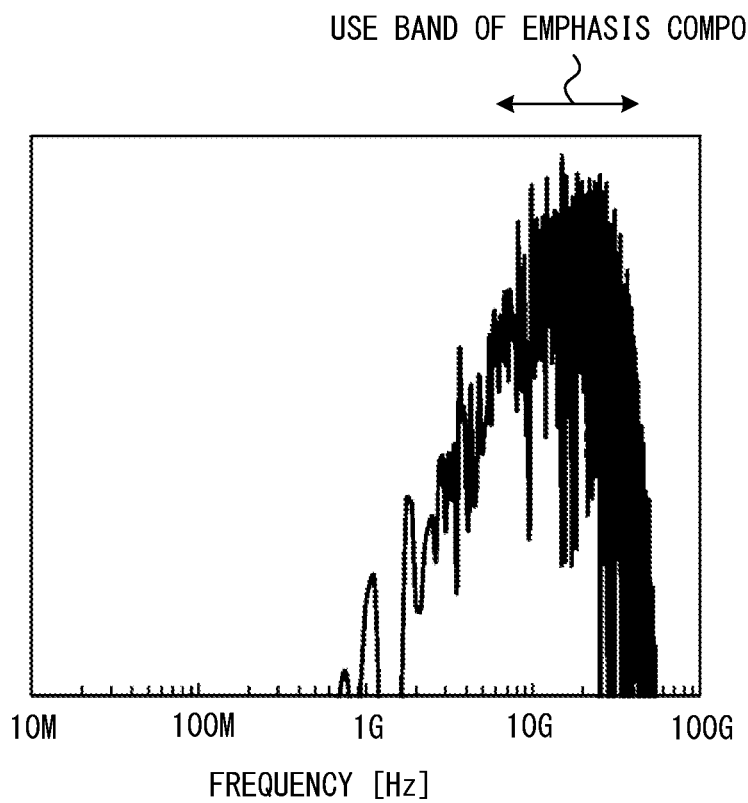

FIGS. 5A and 5B are diagrams illustrating frequency characteristics of signals in the drive circuit 100. In the following description, a sub-segment to which the drive signal C indicating the transmission data is provided may be referred to as a "modulation segment". Further, a sub-segment to which the emphasis component signal E is provided may be referred to as an "emphasis segment".

FIG. 5A illustrates frequency characteristics of a data signal. The data signal has a signal component over a wide band. Here, the frequency characteristic of the drive signal C is substantially the same as the frequency characteristic of the data signal. In addition, in the sample configuration illustrated in FIG. 3A, the frequency characteristics of the signal A and the signal B are substantially the same as the frequency characteristics of the data signal.

FIG. 5B illustrates frequency characteristics of the emphasis component signal E output from the subtractor circuit 16. In the emphasis component signal E, signal components are concentrated in the vicinity of a frequency corresponding to a bit rate or a baud rate of transmission data.

Figure 6A:
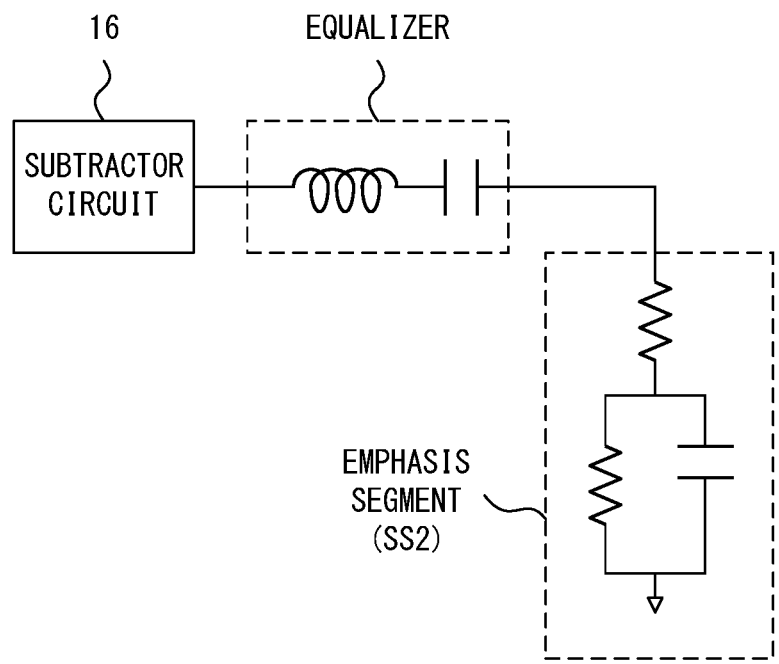
FIGS. 6A and 6B are diagrams for explaining signals applied to an emphasis segment.
Figure 6B:
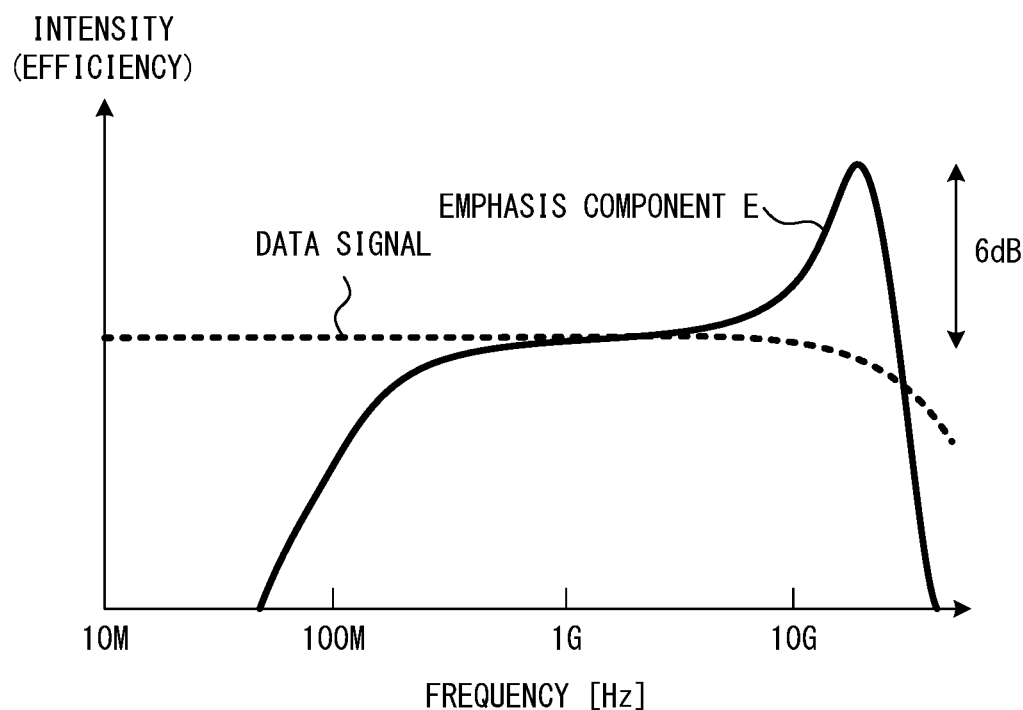

FIGS. 6A and 6B are diagrams for explaining signals applied to the emphasis segment SS2. The segment to which the electric signal is applied is indicated by a resistance component and a capacitance component. Furthermore, in this example, as illustrated in FIG. 6A, an equalizer is provided between the subtractor circuit 16 that generates the emphasis component signal E and the emphasis segment SS2. The equalizer includes an inductor and a capacitor connected in series. In this case, the equalizer works as an amplifier in a specified frequency range. That is, if the values of the inductor and the capacitor are appropriately configured, the equalizer can amplify the signal component of the emphasis component signal E. As an example, as illustrated in FIG. 6B, it is possible to increase the intensity or efficiency of the emphasis component signal E by about 6 dB as compared with the data signal in the frequency range corresponding to the bit rate or the baud rate of the transmission data. In other words, it is possible to reduce the drive current for generating the emphasis component signal E.

Here, in the sample configuration, the electric signal applied to the emphasis segment SS2 is the delay signal B and has the frequency characteristic illustrated in FIG. 5A. On the other hand, in the embodiment of the present invention, the electric signal applied to the emphasis segment SS2 is the emphasis component signal E, and has the frequency characteristic illustrated in FIG. 5B. That is, as compared with the sample configuration, the signal component of the electric signal applied to the emphasis segment SS2 is limited to the high frequency band. Therefore, in the embodiment of the present invention, as illustrated in FIG. 6B, the intensity or efficiency of the electric signal applied to the emphasis segment SS2 can be improved as compared to the sample configuration.

In addition, the emphasis component signal E is added to the drive signal C as an overshoot/undershoot component. That is, the amplitude of the emphasis component signal E is smaller than that of the drive signal C. Therefore, the current for generating the emphasis component signal E in the embodiment of the present invention can be made smaller than that of the drive signal C in the sample configuration.

Figure 7A:
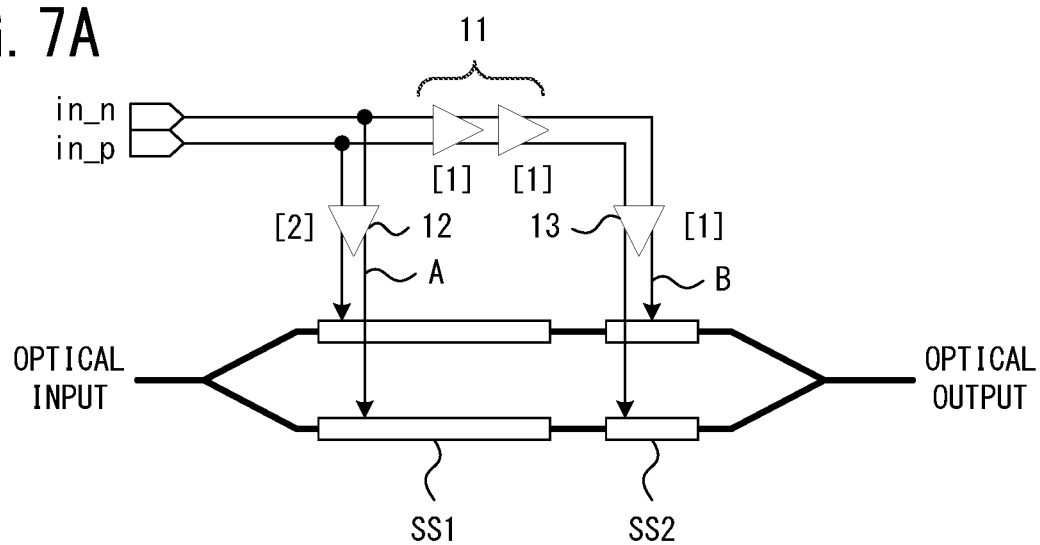
FIGS. 7A, 7B, 8A, and 8B are diagrams for explaining effects according to the embodiment of the present invention.
Figure 7B:
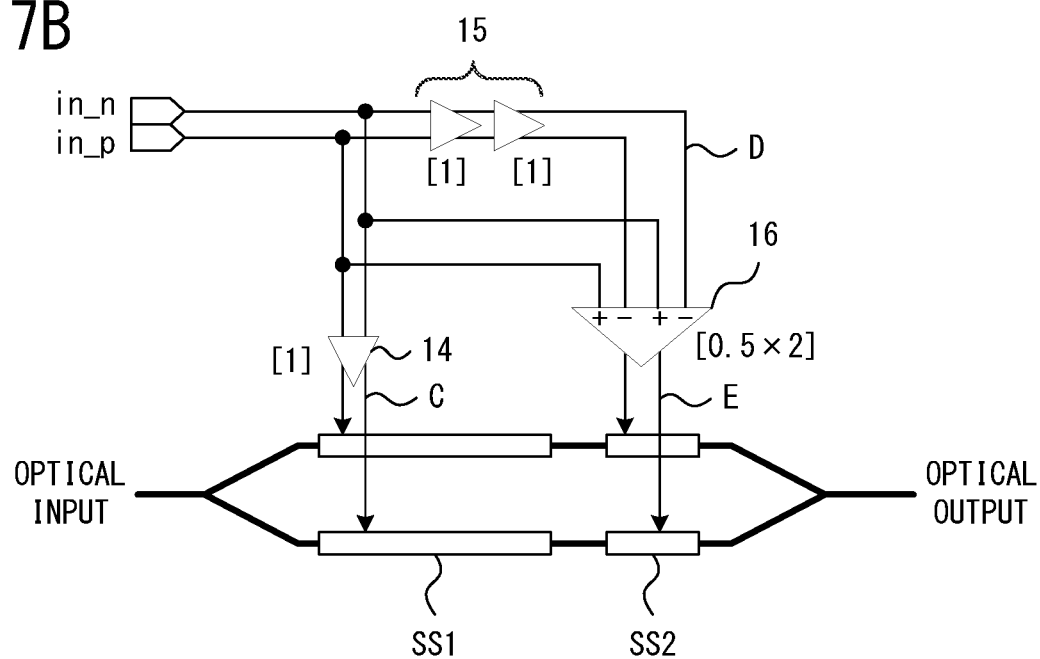
Figure 8A:
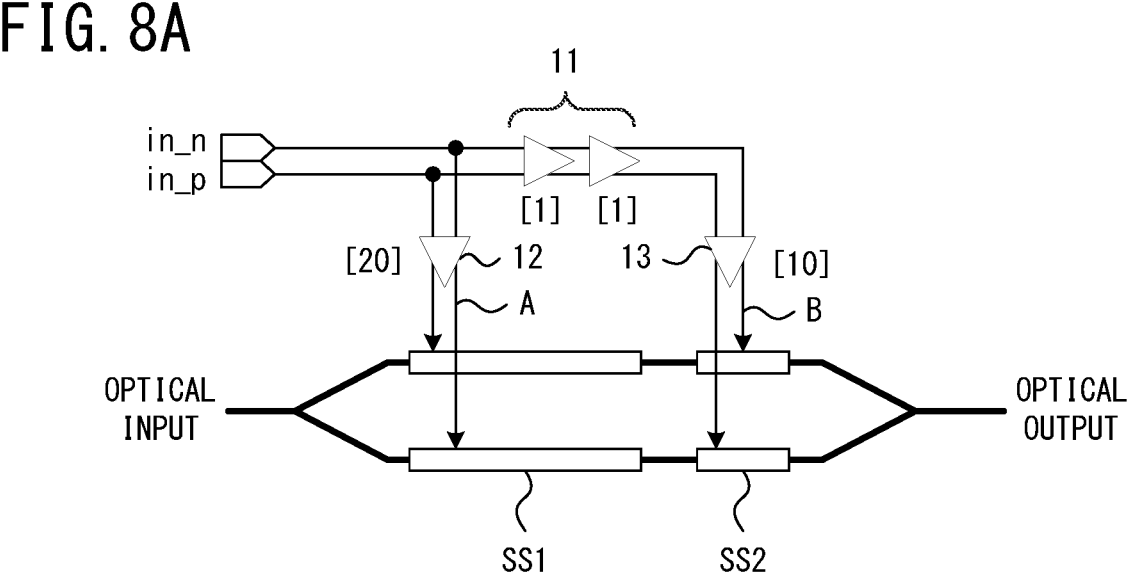
Figure 8B:
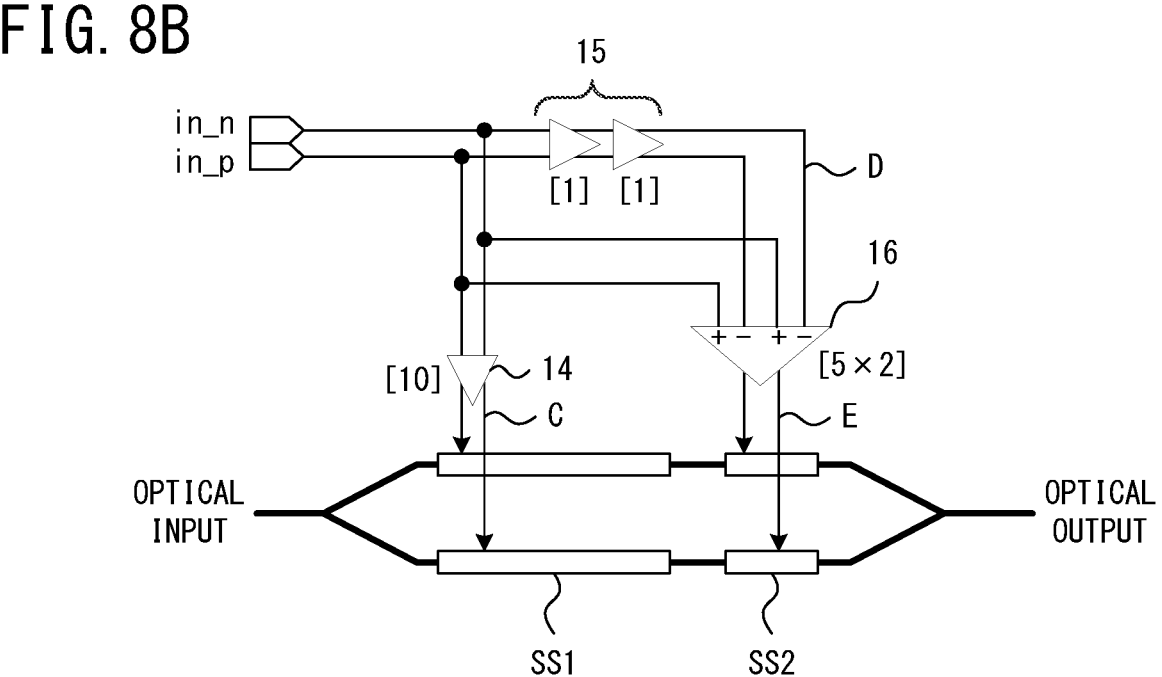

FIGS. 7A, 7B, 8A, and 8B are diagrams for explaining effects according to the embodiment of the present invention. Here, the sample configuration illustrated in FIG. 3A is compared with the embodiment of the present invention illustrated in FIG. 4A. FIGS. 7A and 8A illustrate the power of the sample configuration, and FIGS. 7B and 8B illustrate the power of the embodiment of the present invention.

The delay circuit 11 in the sample configuration and the delay circuit 15 in the embodiment of the present invention are the same as each other. In this example, the power consumption of the delay circuits 11 and 15 is "2". Each of the amplifier 12 and the amplifier 14 generates a drive signal to be applied to the modulation segment SS1. Here, in order to generate the same optical signal in the sample configuration and the embodiment of the present invention, it is required that the emphasized signal illustrated in FIG. 3B and the emphasized signal F illustrated in FIG. 4B are the same. However, the emphasized signal of the sample configuration is equivalent to a signal obtained by subtracting the delay signal B from the signal A. On the other hand, the emphasized signal F of the embodiment of the present invention is equivalent to a signal obtained by adding the emphasis component signal E to the drive signal C. Therefore, the amplitude of the signal A output from the amplifier 12 is larger than the amplitude of the drive signal C output from the amplifier 14. That is, the drive current supplied to the amplifier 12 is larger than the drive current supplied to the amplifier 14. Therefore, the power consumption of the amplifier 12 is larger than the power consumption of the amplifier 14. In the case illustrated in FIG. 7A, the power consumption of the amplifier 12 is "2", and the power consumption of the amplifier 14 is "1".

The amplifier 13 in the sample configuration amplifies the delay signal B applied to the emphasis segment SS2. In this example, the power consumption of the amplifier 13 is "1". In the embodiment of the present invention, the emphasis component signal E is generated by the subtractor circuit 16. Here, the subtractor circuit 16 performs a subtraction operation for each of a set of signals (a non-inverted signal and an inverted signal) constituting a differential signal. Therefore, the subtractor circuit 16 includes one set of amplifiers. However, as described with reference to FIGS. 5A to 6B, since the signal component of the emphasis component signal E is concentrated in the vicinity of the frequency corresponding to the bit rate or the baud rate of the transmission data, the intensity can be increased using the equalizer or the like illustrated in FIG. 6A. That is, the capability of each amplifier included in the subtractor circuit 16 may be lower than that of the amplifier 13 provided in the sample configuration. Therefore, in this example, the power consumption of each amplifier included in the subtractor circuit 16 is configured to be "0.5". In this case, the power consumption of the subtractor circuit 16 is "1".

As described above, the power consumption of the drive circuit having the sample configuration is "5". On the other hand, in the embodiment of the present invention, the power consumption of the drive circuit 100 is "4". That is, when the same optical signal is generated (alternatively, when the electric signals for driving the optical modulator 10 are the same), the power consumption of the drive circuit is reduced.

In the example illustrated in FIG. 7A, the power consumption is calculated on the assumption that the signal intensity of the circuit (12, 13, 14, 16) that drives the segment of the optical modulator 10 is the same as the signal intensity of the logic circuit (11, 15). However, the logic circuit normally outputs a signal with minimum necessary intensity. On the other hand, the circuit that drives the segment of the optical modulator 10 outputs a signal of large power in order to perform sufficient phase control in the optical modulator 10. As an example, it is assumed that the intensity of the signal output from the circuit that drives the segment is 10 times the signal intensity of the logic circuit. In this case, as illustrated in FIG. 8A, the power consumption of the sample configuration is "32", and the power consumption of the embodiment of the present invention is "22". In this case, the power consumption is reduced by about 31 percent.

Figure 9A:
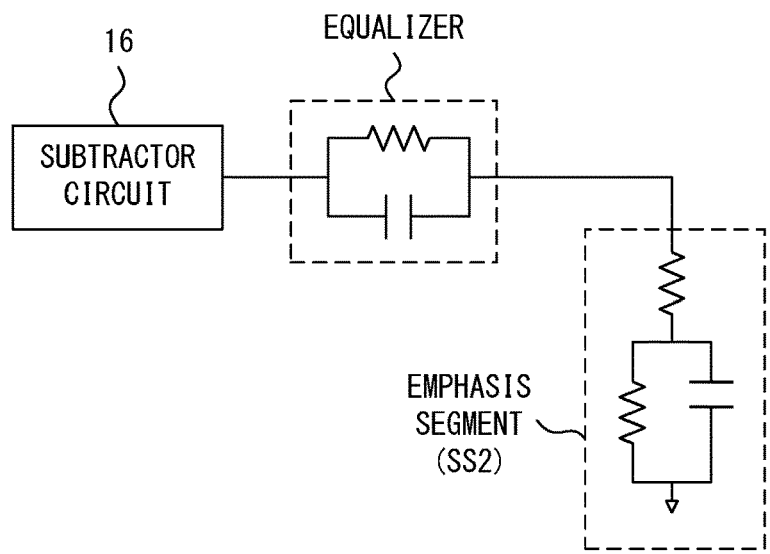
FIGS. 9A to 9C illustrate examples of the emphasis segment.
Figure 9B:
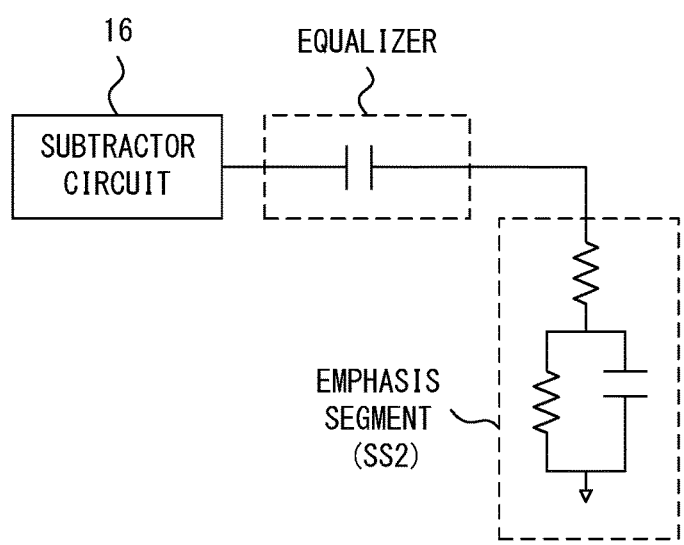
Figure 9C:
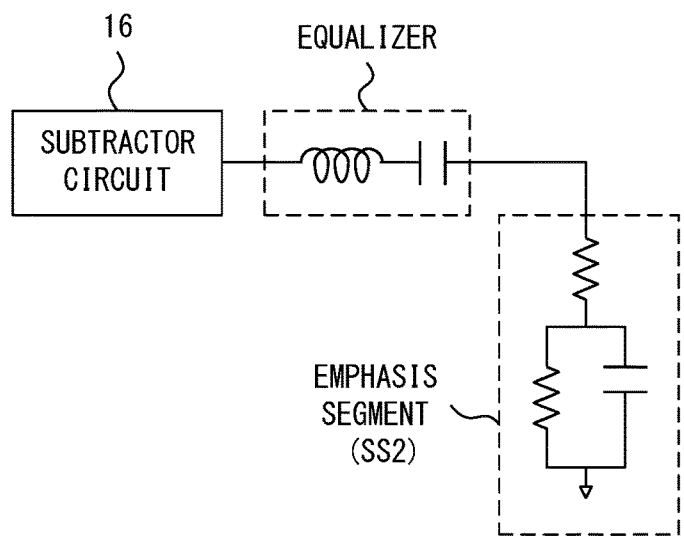
Figure 10:
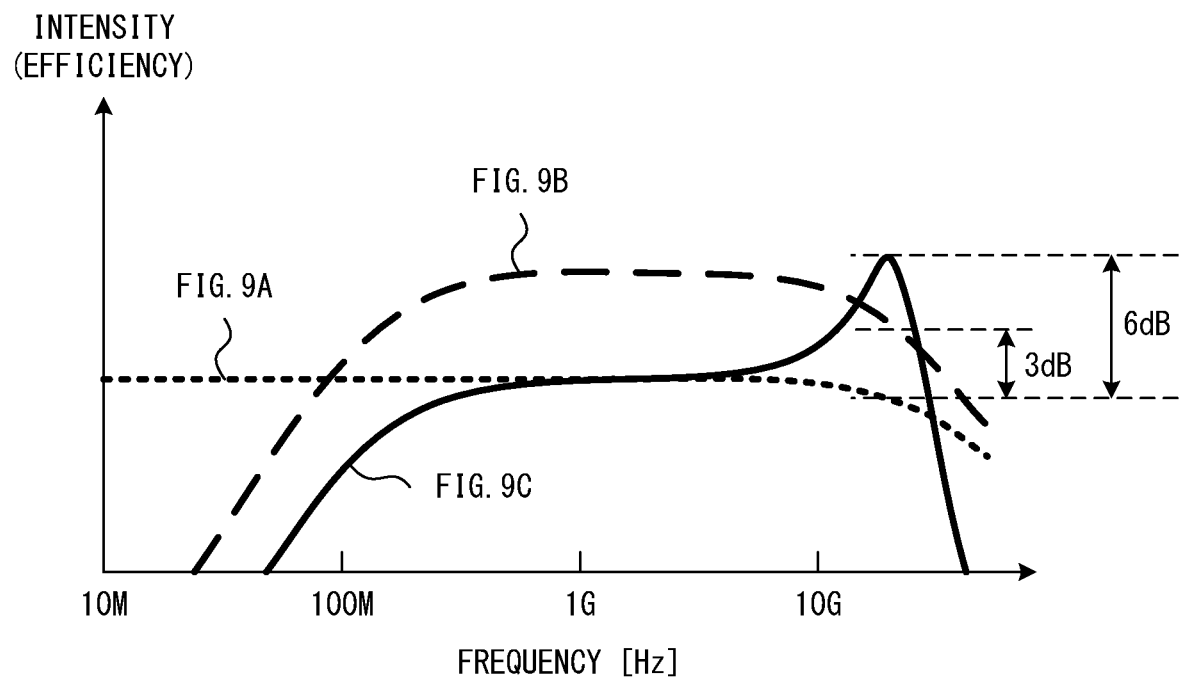
FIG. 10 illustrates frequency characteristics for the configurations illustrated in FIGS. 9A to 9C.

FIGS. 9A to 9C illustrate examples of the emphasis segment. In this example, an equalizer is provided between the subtractor circuit 16 illustrated in FIG. 4A and the emphasis segment SS2 to which the emphasis component signal E is applied. FIG. 10 illustrates frequency characteristics for the configurations illustrated in FIGS. 9A to 9C.

The equalizer illustrated in FIG. 9A is a broadband filter, and includes a resistor and a capacitor connected in parallel to each other. The equalizer illustrated in FIG. 9B includes a capacitor. According to this configuration, the low frequency component is removed, but the signal intensity can be increased in the frequency range corresponding to the data signal by appropriately configuring the capacitance value. In this example, as compared with the configuration illustrated in FIG. 9A, according to the configuration illustrated in FIG. 9B, the signal intensity is increased by 3 dB in the frequency range corresponding to the data signal. That is, 1.4 times the efficiency can be obtained as compared with the normal configuration. Therefore, even with this configuration illustrated in FIG. 9B, the capability of the circuit for driving the segment can be reduced as compared with the sample configuration. As a result, power consumption is reduced by about 19 percent.

The equalizer illustrated in FIG. 9C is the same as the configuration illustrated in FIG. 6A, and includes an inductor and a capacitor connected in series. According to this configuration, the signal intensity can be further increased in the frequency range corresponding to the data signal by appropriately configuring the inductance and the capacitance value. In this example, as compared with the configuration illustrated in FIG. 9A, according to the configuration illustrated in FIG. 9C, the signal intensity is increased by 6 dB in the frequency range corresponding to the data signal. That is, about twice the efficiency can be obtained as compared with the normal configuration. Therefore, according to this configuration illustrated in FIG. 9C, the capability of the circuit that drives the segment can be further reduced as compared with the sample configuration. As a result, power consumption is reduced by about 31 percent.

Figure 11:
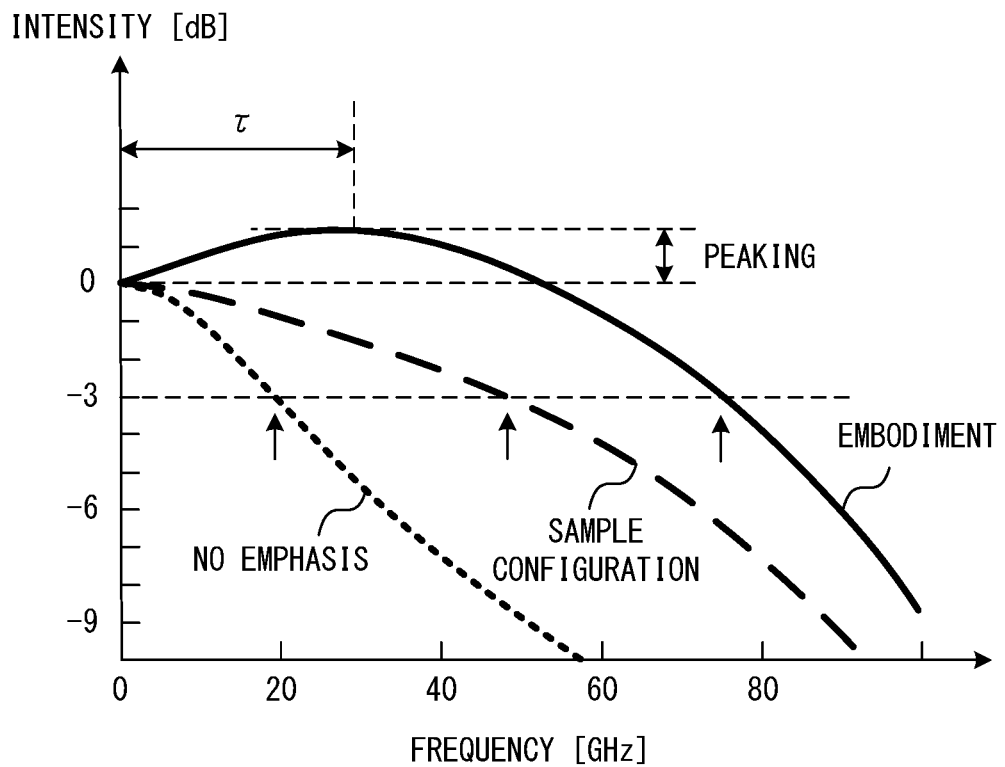
FIGS. 11, 12A, and 12B are diagrams for explaining other effects according to the embodiment of the present invention.
Figure 12A:
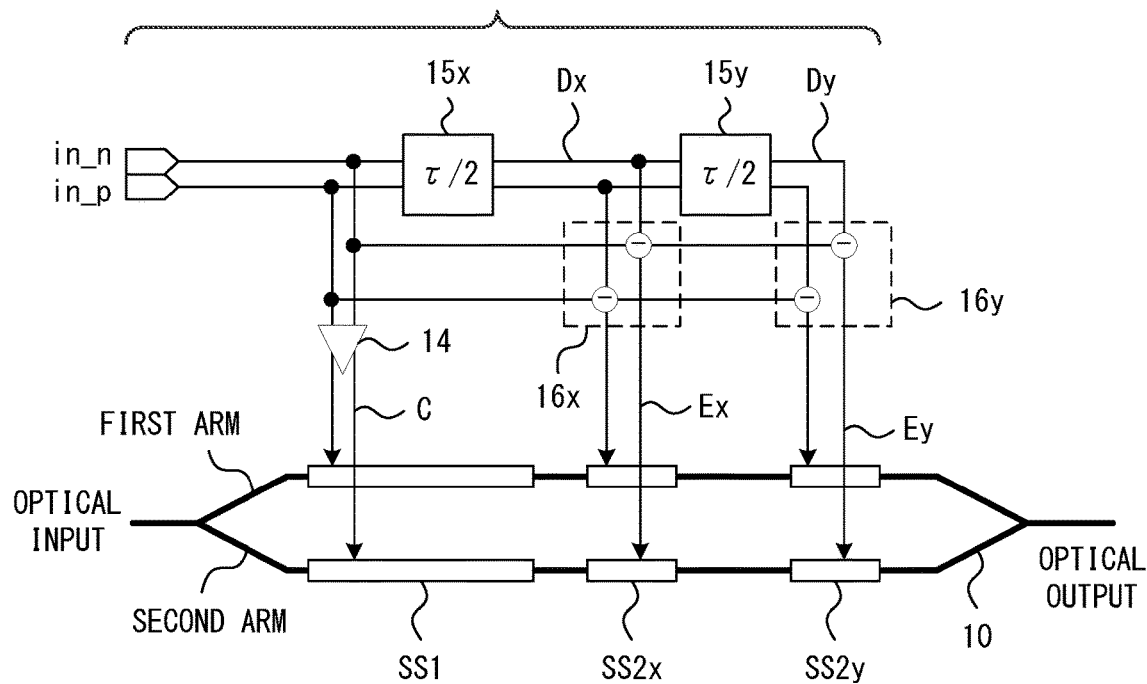
Figure 12B:
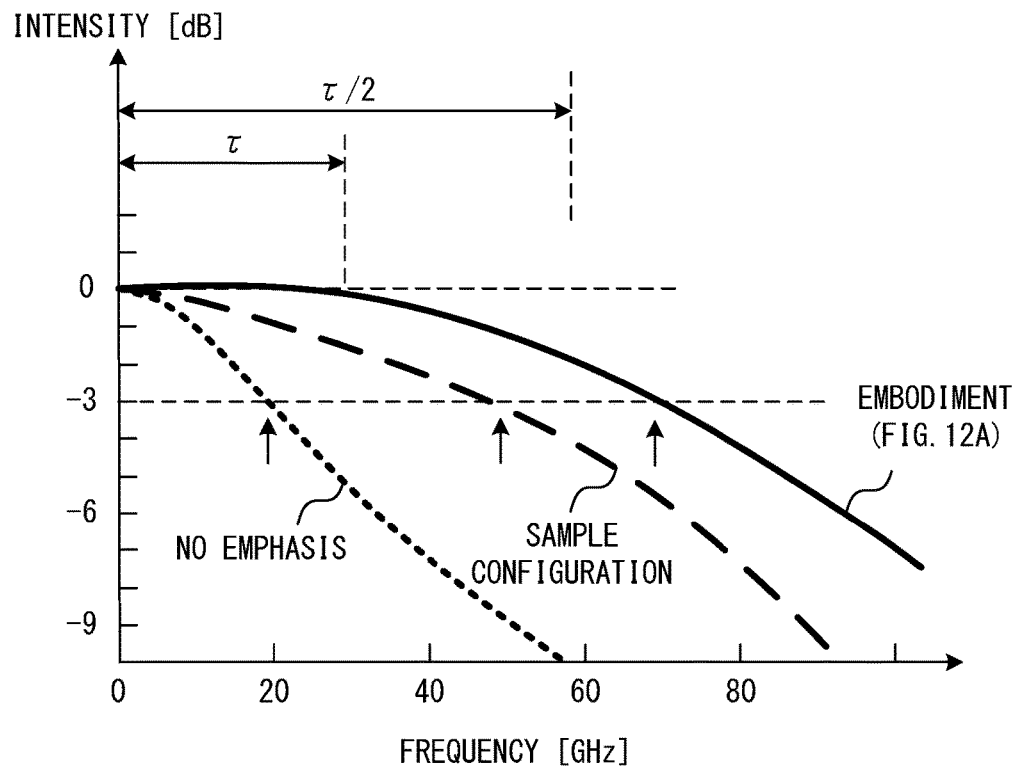

FIGS. 11, 12A, and 12B are diagrams for explaining other effects according to the embodiment of the present invention. FIGS. 7A, 7B, 8A, and 8B illustrate that power consumption for generating the same optical signal can be reduced. On the other hand, in FIGS. 11, 12A, and 12B, bandwidths obtained with the same power consumption are compared.

In FIG. 11, "NO EMPHASIS" represents frequency characteristics obtained by the configuration illustrated in FIGS. 2A and 2B. In this case, the frequency at which the drive signal decreases by 3 dB is about 19.2 GHz. Therefore, when the bit rate of the data signal is high, the waveform of the drive signal is rounded as illustrated in FIG. 2B, and the waveform of the optical signal is also deteriorated.

"SAMPLE CONFIGURATION" represents frequency characteristics obtained by the configuration illustrated in FIG. 3A. In this case, the frequency at which the drive signal decreases by 3 dB is about 47.8 GHz. Therefore, for example, even when the bit rate of the data signal is about 20 Gbps, an optical signal having a good waveform can be generated.

"EMBODIMENT" represents a frequency characteristic obtained by the configuration illustrated in FIG. 4A. In this case, the frequency at which the drive signal decreases by 3 dB is about 75.3 GHz. That is, since the intensity of the emphasis can be doubled as compared with the sample configuration, the bandwidth is further expanded. As a result, an optical signal having a better waveform is expected. However, when the emphasis is too strong, peaking may occur. In this case, jitter may increase. Note that peaking may occur at a frequency corresponding to the delay time $\tau$ generated in the delay circuit 15.

In the example illustrated in FIG. 11, the bandwidth is expanded by doubling the intensity of the emphasis as compared with the sample configuration. On the other hand, in the example illustrated in FIG. 12A, two emphasis component signals are generated using two subtractor circuits, thereby expanding the bandwidth.

For example, in the example illustrated in FIG. 12A, a delay circuit 15x delays the input signal IN by $\tau/2$ to generate a delay signal Dx. In addition, a delay circuit 15y further delays the delay signal Dx by $\tau/2$ to generate a delay signal Dy. A subtractor circuit 16x generates an emphasis component signal Ex by subtracting the delay signal Dx from the input signal IN. A subtractor circuit 16y generates an emphasis component signal Ey by subtracting the delay signal Dy from the input signal IN. The modulation segment SS1 and emphasis segments SS2x and SS2y are provided in the arm waveguide of the optical modulator 10. Then, the drive signal C is provided to the modulation segment SS1, the emphasis component signal Ex is provided to the emphasis segment SS2x, and the emphasis component signal Ey is provided to the emphasis segment SS2y.

In this case, as illustrated in FIG. 12B, the bandwidth is about 67.0 GHz. That is, the bandwidth is expanded by about 1.4 times as compared with the sample configuration. In addition, since peaking is suppressed, a good waveform with less jitter can be obtained.

Figure 13A:
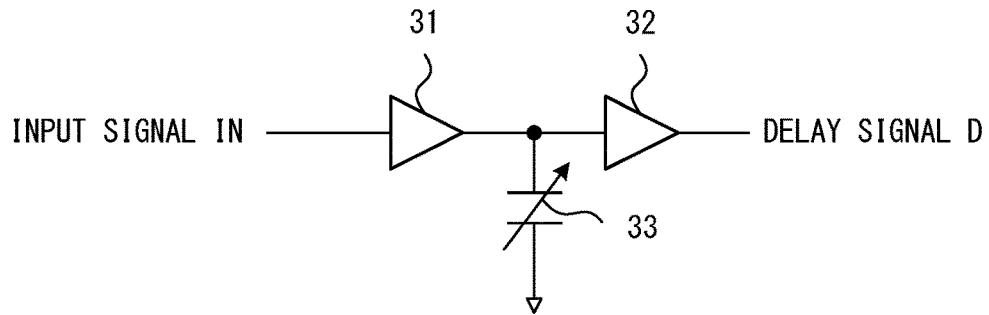
FIGS. 13A to 13C illustrate examples of a delay circuit.
Figure 13B:
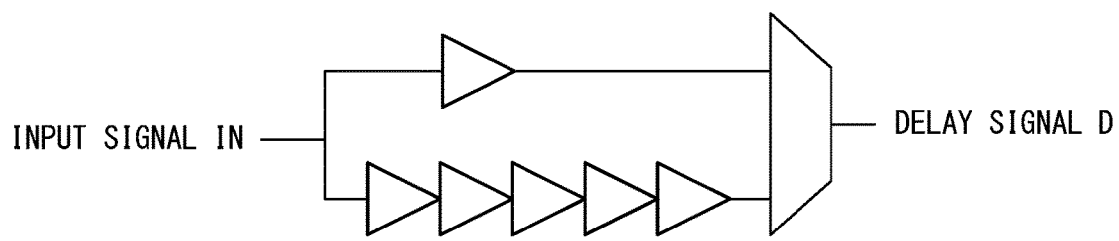
Figure 13C:
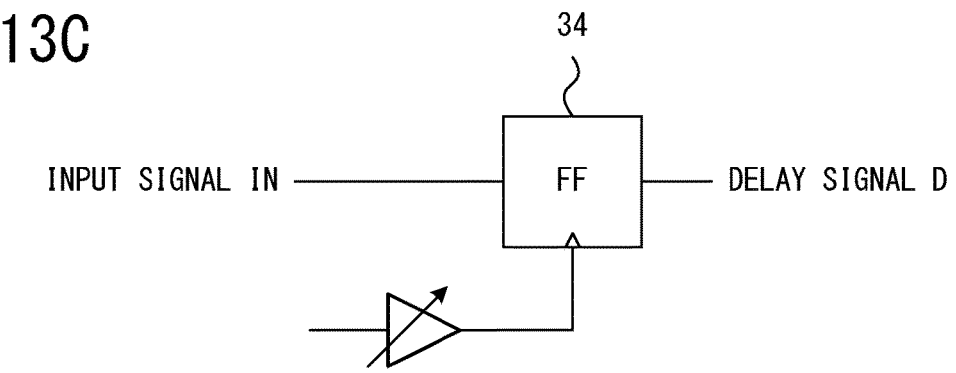

FIGS. 13A to 13C illustrate examples of the delay circuit. In the example illustrated in FIG. 13A, the delay circuit 15 is realized by a plurality of amplifiers and variable capacitors. In this example, the delay circuit 15 is realized by two amplifiers 31 and 32 and a variable capacitor 33. In this case, the amplifier 31 amplifies the input signal IN. Here, the signal line between the amplifiers 31 and 32 is connected to the ground (alternatively, a specified power supply) by a variable capacitor. Therefore, the edge of the input signal of the amplifier 32 is rounded. Then, the amplifier 32 amplifies the output signal of the amplifier 31. At this time, the edge of the output signal of the amplifier 32 is delayed with respect to the edge of the input signal of the amplifier 31. As a result, the delay signal D is generated. The delay amount is configured by the capacitance value of the variable capacitor. Note that the amplifiers 31 and 32 correspond to two amplifiers constituting the delay circuit 15 in FIG. 7B or 8B.

In the example illustrated in FIG. 13B, paths having different delay amounts are provided. The delay amount of the path is configured by, for example, the number of amplifiers. In the example illustrated in FIG. 13C, the delay circuit 15 is realized using a flip-flop circuit 34. In this configuration, a desired delay time is realized by adjusting the timing of the clock signal provided to the clock terminal of the flip-flop circuit 34.

Figure 14A:
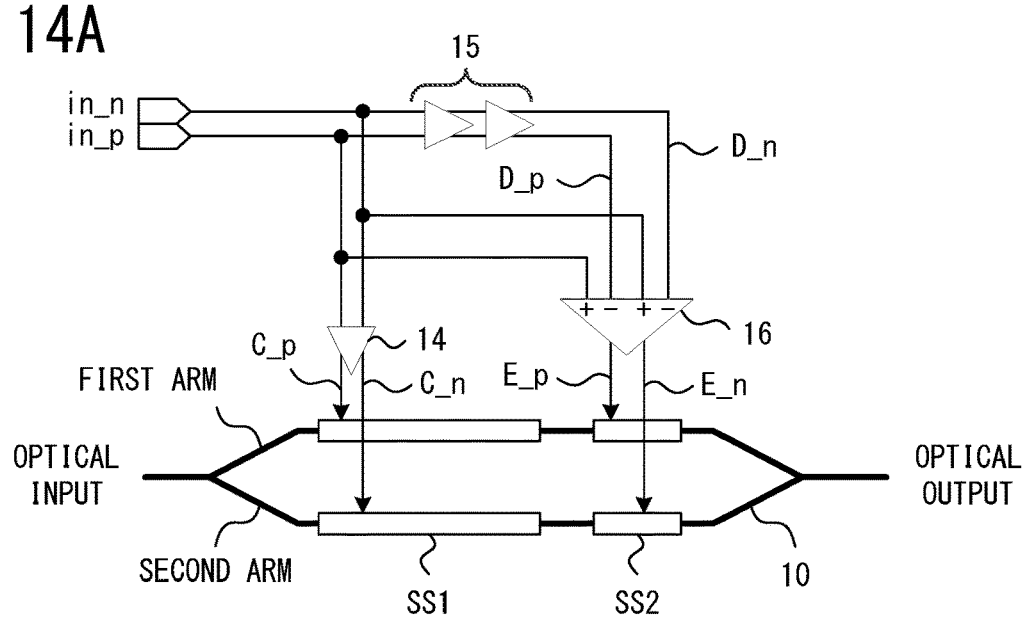
FIGS. 14A to 14C illustrate an example of a configuration in which a drive circuit is realized by a CML circuit.
Figure 14B:
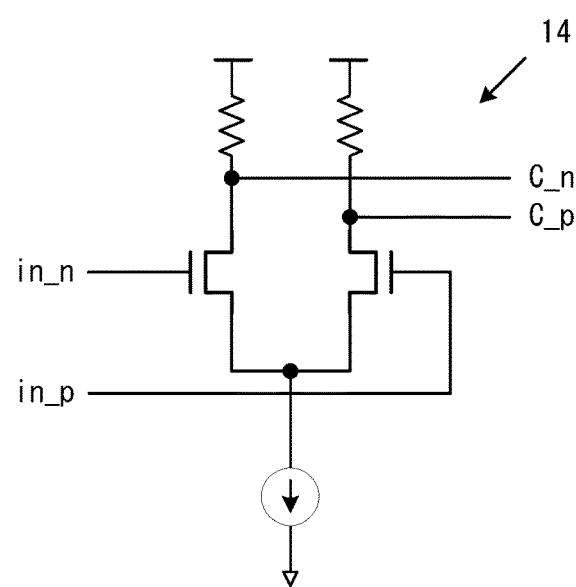
Figure 14C:
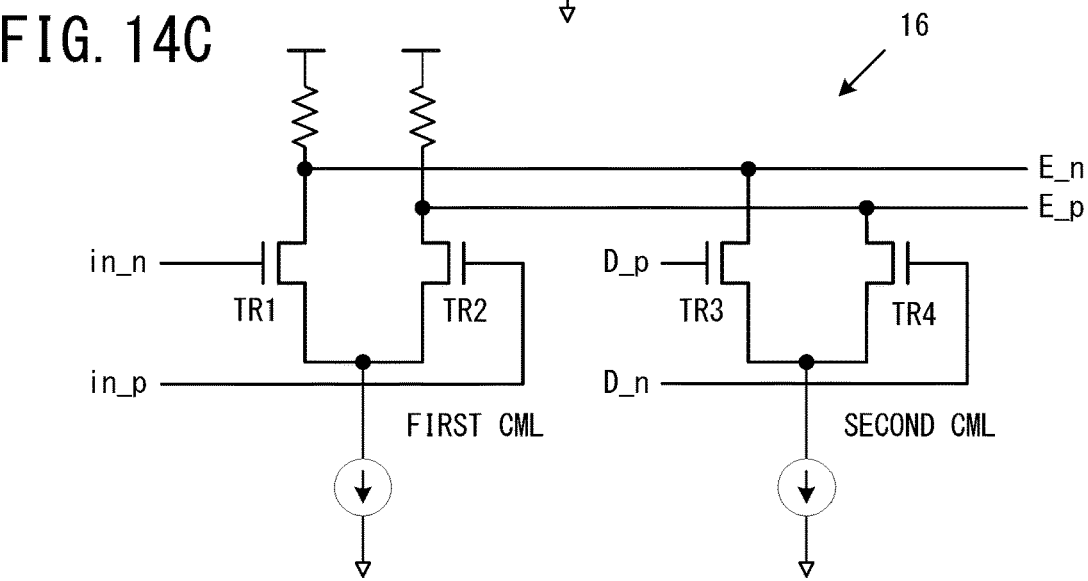

FIGS. 14A to 14C illustrate an example of a configuration in which a drive circuit is realized by a current mode logic (CML) circuit. In this example, as illustrated in FIG. 14A, an input signal in_p/in_n indicating transmission data is provided to the drive circuit. The amplifier 14 amplifies the input signal in_p/in_n to generate a drive signal C_p/C_n. The drive signal C_p is provided to the modulation segment SS1 provided in the first arm, and the drive signal C_n is provided to the modulation segment SS1 provided in the second arm. The delay circuit 15 generates a delay signal D_p/D_n by delaying the input signal in_p/in_n. The subtractor circuit 16 generates an emphasis component signal E_p/E_n by subtracting the delay signal D_p/D_n from the input signal in_p/in_n. The emphasis component signal E_p is provided to the emphasis segment SS2 provided in the first arm. The emphasis component signal E_n is provided to the emphasis segment SS2 provided in the second arm.

As illustrated in FIG. 14B, the amplifier 14 is realized by a CML circuit including a set of transistors provided in parallel with each other. A drain of each transistor is connected to a power supply via a resistor. A source of each transistor is connected to a common current source. Then, the input signal in_p/in_n is applied to the gate of each transistor. With this configuration, the drive signal C_p/C_n for driving the modulation segment SS1 is generated.

The delay circuit 15 may be realized by the CML circuit illustrated in FIG. 14B. For example, in a case where the delay circuit 15 is realized by the configuration illustrated in FIG. 13A, the amplifiers 31 and 32 may each be realized by the circuit illustrated in FIG. 14B. However, the current flowing through the delay circuit 15 is sufficiently smaller than that of the amplifier 14.

As illustrated in FIG. 14C, the subtractor circuit 16 includes a first CML circuit and a second CML circuit. The configuration of the first CML circuit is the same as that of the CML circuit illustrated in FIG. 14B. In addition, the configuration of the second CML circuit is also substantially the same as that of the CML circuit illustrated in FIG. 14B. The drain of each transistor of the first CML circuit is connected to the drain of the corresponding transistor of the second CML circuit. In FIG. 14C, the drains of the transistors TR1 and TR3 are connected to each other, and the drains of the transistors TR2 and TR4 are connected to each other.

The input signal in_p/in_n is applied to the gate of each transistor of the first CML circuit. The delay signal D_p/D_n is provided to the gate of each transistor of the second CML circuit. At this time, the delay signal D_p/D_n is applied to the second CML circuit in an inverted state with respect to the input signal in_p/in_n. Specifically, when the input signal in_p is applied to the transistor TR1, the delay signal D_p is applied to the transistor TR4. Furthermore, when the input signal in_n is applied to the transistor TR2, the delay signal D_n is applied to the transistor TR3. With this configuration, subtraction is realized using the addition circuit, and the emphasis component signal E_p/E_n is generated.

As described above, the subtractor circuit 16 is realized by the two CML circuits. Here, the configuration of each CML circuit is equivalent to the circuit illustrated in FIG. 14B that generates the drive signal C applied to the modulation segment. Therefore, the subtractor circuit 16 can directly drive the emphasis segment SS2.

Variations

Figure 15A:
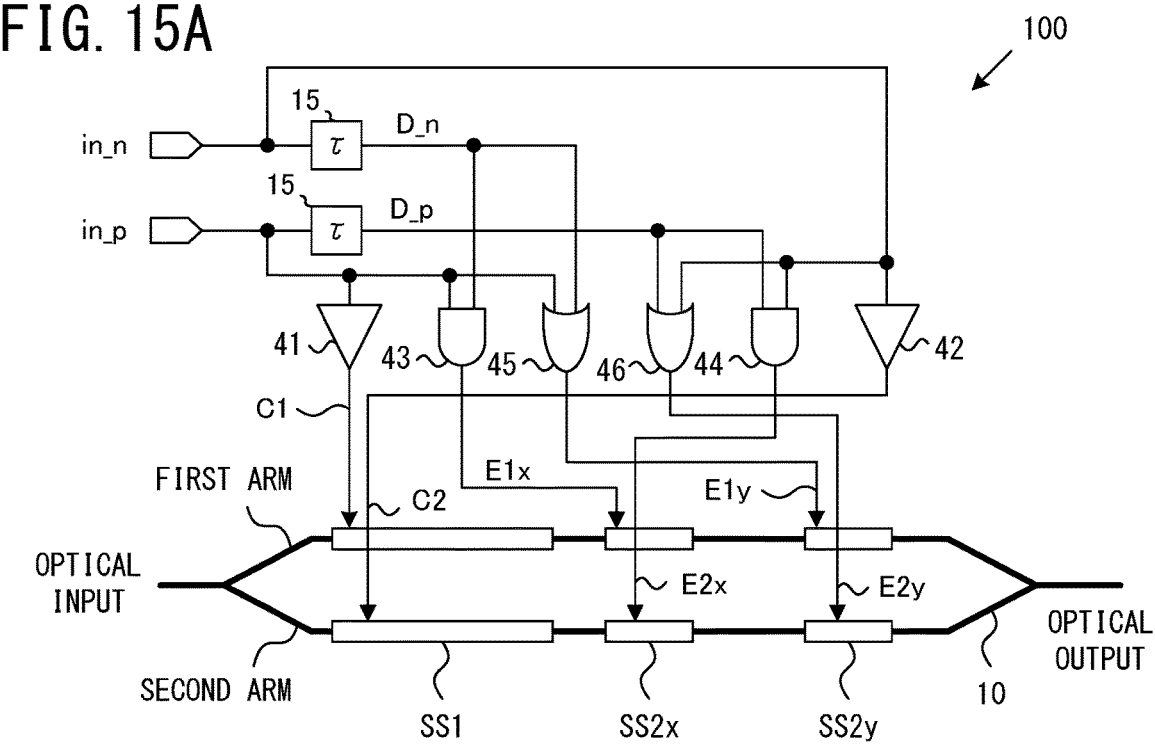
FIGS. 15A and 15B illustrate a first variation of the embodiment of the present invention.
Figure 15B:
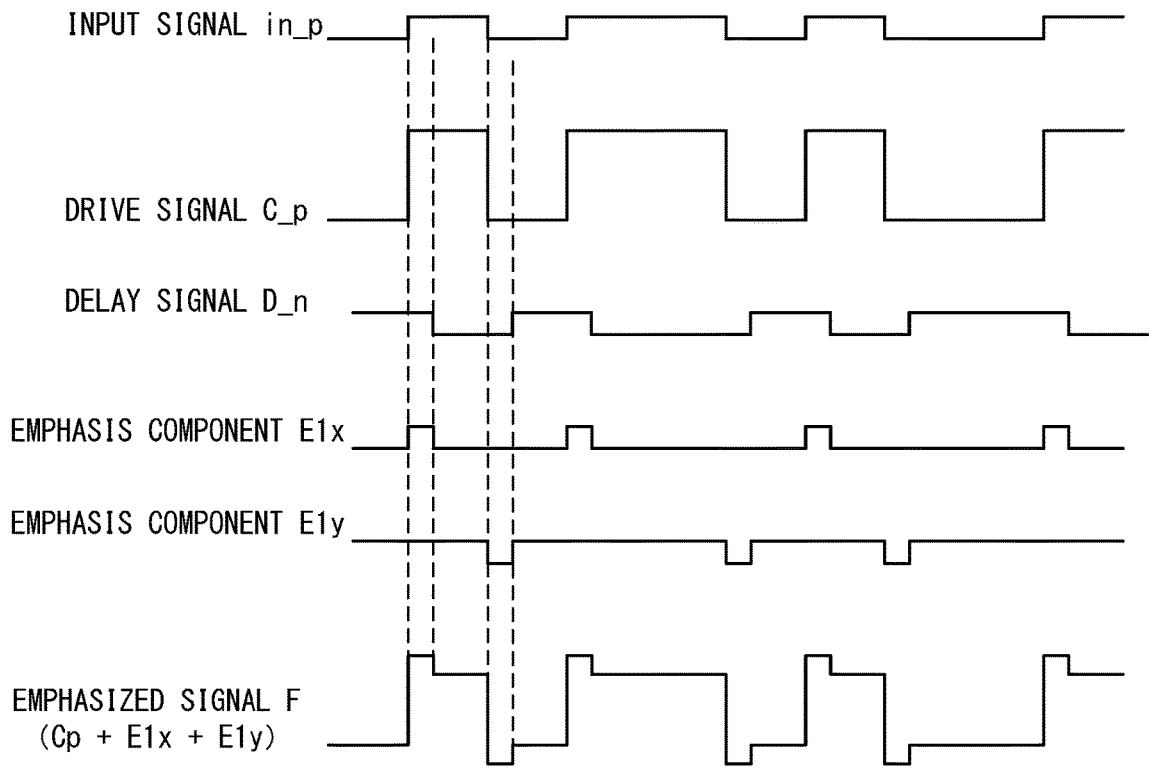

FIGS. 15A and 15B illustrate a first variation of the embodiment of the present invention. In the first variation, an emphasis component is generated using a CMOS circuit. Note that an optical modulator 10 includes a modulation segment SS1 and emphasis segments SS2x and SS2y.

As illustrated in FIG. 15A, a drive circuit 100 includes a delay circuit 15, amplifier circuits 41 and 42, AND circuits 43 and 44, and OR circuits 45 and 46. Then, an input signal in_n/in_p is provided to the drive circuit 100. The amplifier circuits 41 and 42 correspond to the amplifier 14 illustrated in FIG. 4A.

The amplifier circuit 41 generates a drive signal C1 by amplifying the input signal in_p. The drive signal C1 is provided to the modulation segment SS1 implemented in a first arm. The delay circuit 15 generates delay signals D_p and D_n by delaying the input signals in_p and in_n. The AND circuit 43 generates a logical product signal E1x from the input signal in_p and the delay signal D_n. As illustrated in FIG. 15B, the logical product signal E1x is a positive pulse, and its pulse width corresponds to the delay time τ of the delay circuit 15. Then, the logical product signal E1x is provided to the emphasis segment SS2x implemented in the first arm. The OR circuit 45 generates a logical sum signal E1y from the input signal in_p and the delay signal D_n. As illustrated in FIG. 15B, the logical sum signal E1y is a negative pulse, and its pulse width corresponds to the delay time τ of the delay circuit 15. Then, the logical sum signal E1y is provided to the emphasis segment SS2y implemented in the first arm.

In this manner, the drive signal C1, the logical product signal E1x, and the logical sum signal E1y are provided to the first arm of the optical modulator 10. Here, as illustrated in FIG. 15B, the logical product signal E1x works as an emphasis component that generates an overshoot at the rising edge of the drive signal C1. In addition, the logical sum signal E1y works as an emphasis component that generates an undershoot at the falling edge of the drive signal C1. Similarly, also in the second arm, an emphasized signal is generated by the amplifier circuit 42, the AMD circuit 44, and the OR circuit 46.

In this configuration, the rising emphasis and the falling emphasis are individually generated, but the power consumption is the same as that of a circuit that generates the rising emphasis and the falling emphasis by one circuit. Also in this configuration, since the emphasis segments SS2x and SS2y are specialized in the emphasis component, power consumption is reduced as compared with the sample configuration.

Figure 16A:
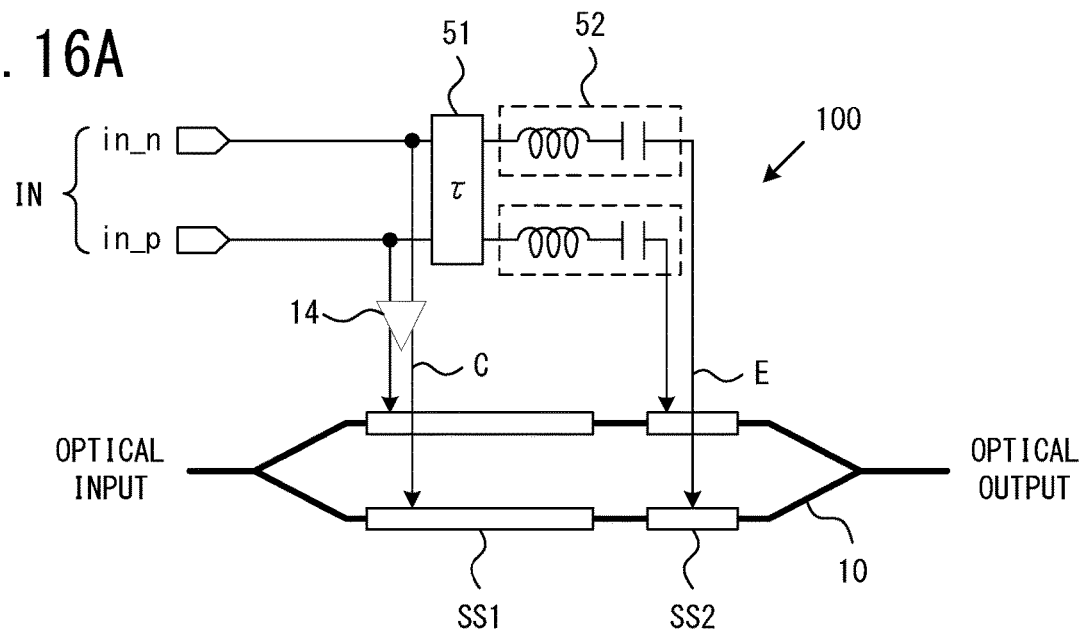
FIGS. 16A and 16B illustrate a second variation of the embodiment of the present invention.
Figure 16B:
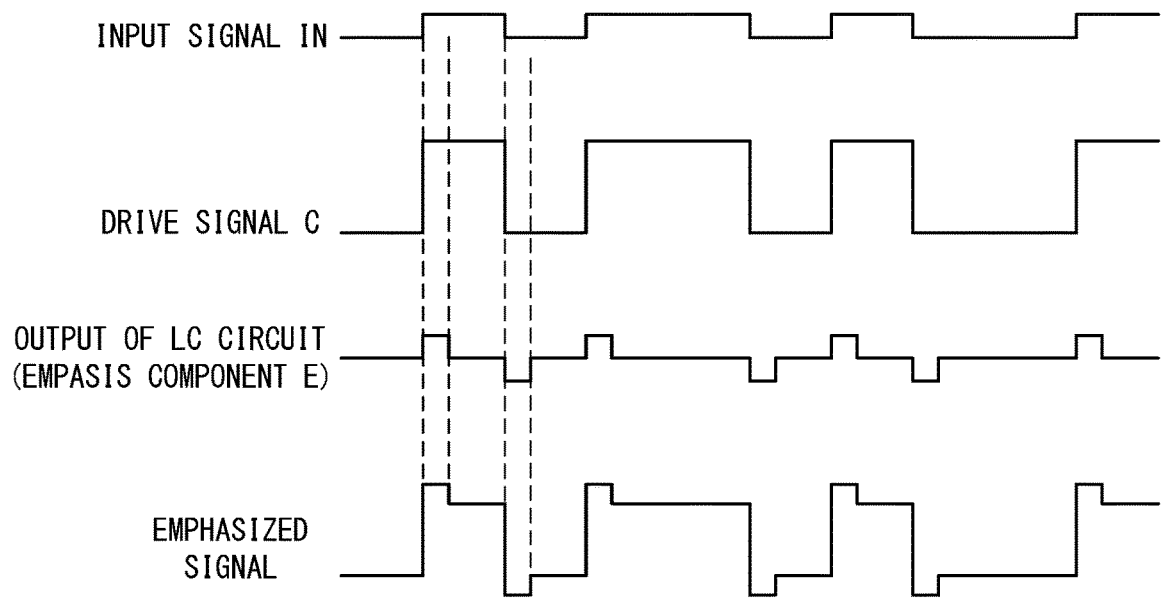

FIGS. 16A and 16B illustrate a second variation of the embodiment of the present invention. In the second variation, an emphasis component is generated using an LC resonance circuit. Note that an optical modulator 10 includes a modulation segment SS1 and an emphasis segment SS2.

As illustrated in FIG. 16A, a drive circuit 100 includes an amplifier 14, a timing adjustment circuit 51, and an LC resonance circuit 52. Then, an input signal IN is provided to the drive circuit 100.

The amplifier 14 generates a drive signal C by amplifying an input signal IN. The drive signal C is provided to the modulation segment SS1. The timing adjustment circuit 51 adjusts the timing of the input signal IN. The output signal of the timing adjustment circuit 51 passes through the LC resonance circuit 52. At this time, as illustrated in FIG. 16B, the LC resonance circuit 52 outputs a positive signal component for the rising edge of the input signal, and outputs a negative signal component for the falling edge of the input signal. That is, the LC resonance circuit 52 generates an emphasis component signal E. Then, the emphasis component signal E output from the LC resonance circuit 52 is provided to the emphasis segment SS2. As a result, the optical modulator 10 is driven by the emphasized signal in which the rising edge and the falling edge are emphasized. Also in this configuration, since the emphasis segment SS2 is specialized in the emphasis component, power consumption is reduced as compared with the sample configuration.

Figure 17:
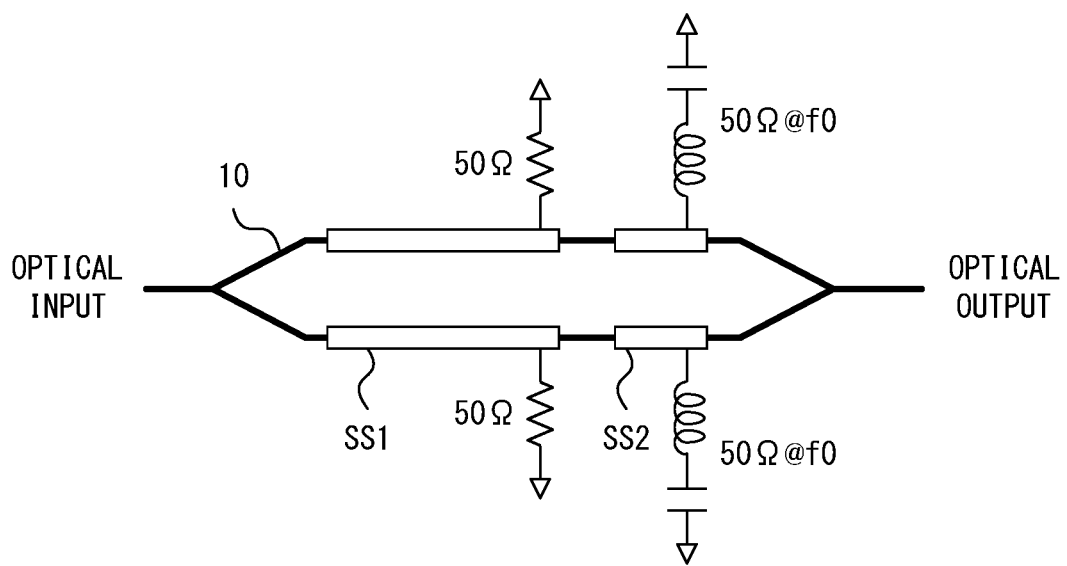
FIG. 17 illustrates a third variation of the embodiment of the present invention.

FIG. 17 illustrates a third variation of the embodiment of the present invention. In the third variation, the length of each segment is relatively long and the drive signal works as a travelling wave. That is, each of the modulation segment SS1 and the emphasis segment SS2 is used as a traveling wave electrode. When the optical modulator 10 is implemented by silicon photonics, each electrode can be formed relatively short, but in an LN modulator or the like, the length of each electrode is relatively long.

The modulation segment SS1 is terminated with a resistance of 50 ohms. On the other hand, the frequency range of the emphasis component provided to the emphasis segment SS2 is limited as illustrated in FIG. 5B. Therefore, the emphasis segment SS2 is terminated with an LC circuit. The LC circuit is preferably designed to have a resistance of 50 ohms at the frequency f0 of the drive signal. Note that substantially no power is consumed at the termination by the LC circuit.

Figure 18:
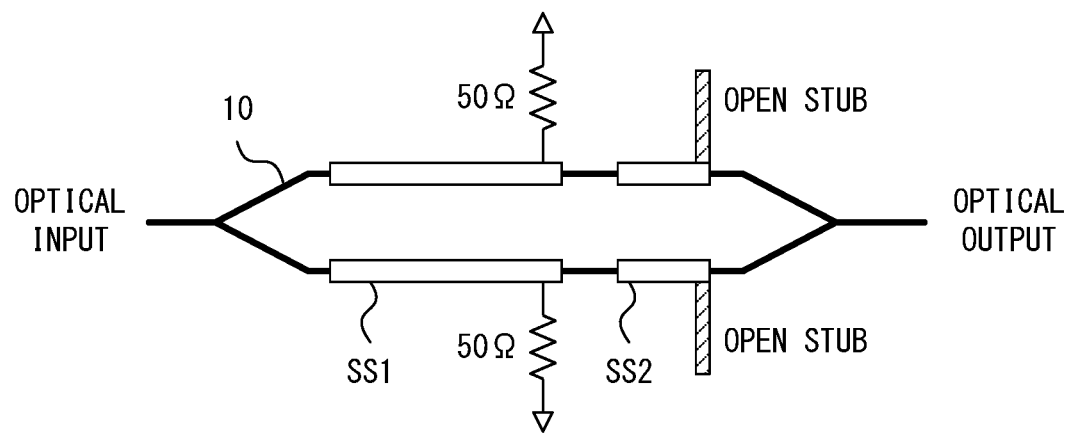
FIG. 18 illustrates a fourth variation of the embodiment of the present invention.

FIG. 18 illustrates a fourth variation of the embodiment of the present invention. In the fourth variation, the emphasis segment SS2 is terminated with an open stub instead of the LC circuit illustrated in FIG. 17. In this case, the length L of the open stub is ¼ of the signal wavelength λ. For example, when the speed of the electric signal propagating through the segment is $2 \times 10^8$ m/s and the signal frequency is 20 GHz, the length L of the open stub is 2.5 mm. Then, the open stub works as a filter that passes only signal components in the frequency range of the signal frequency and its vicinity.

Figure 19:
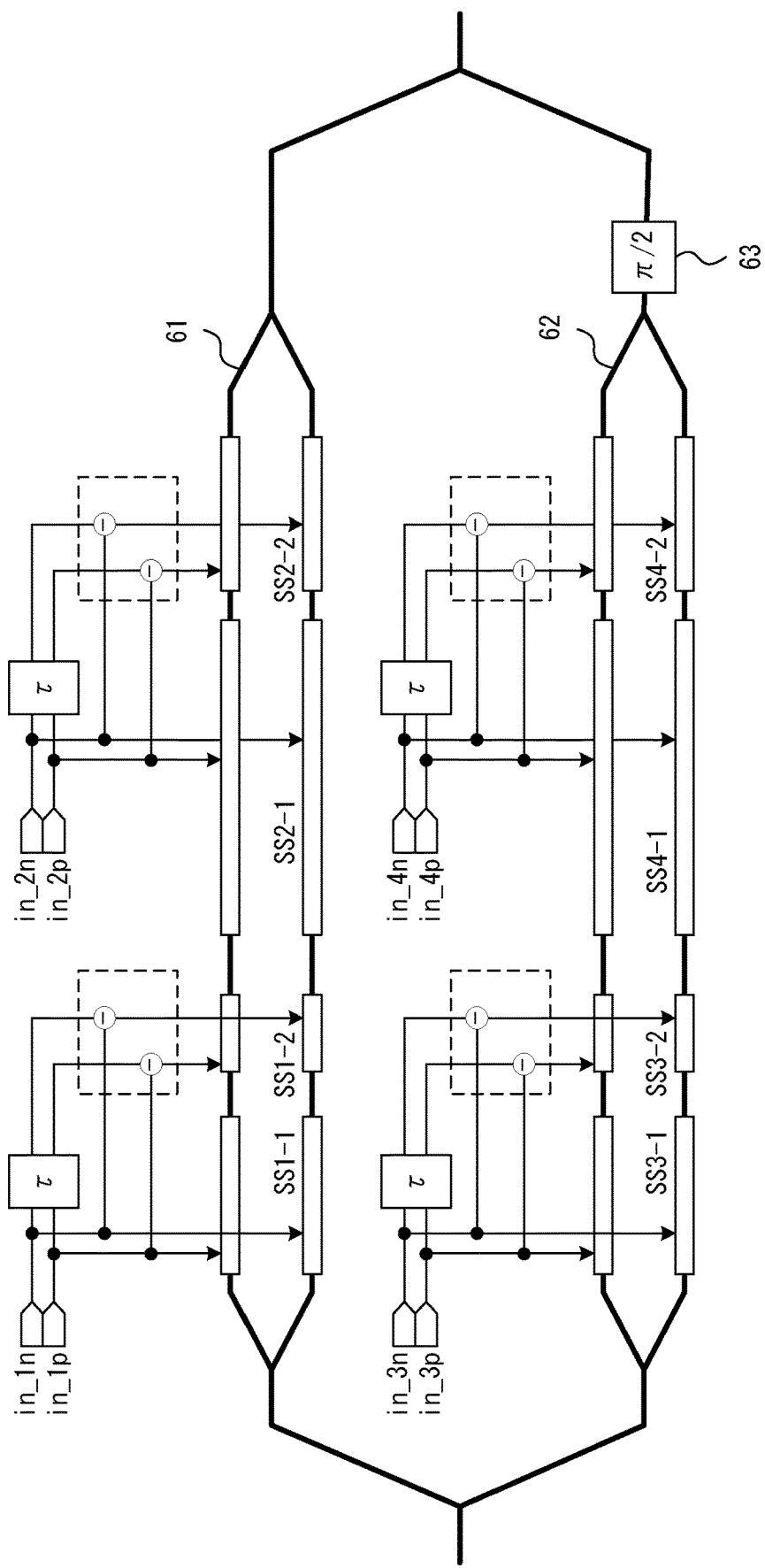
FIG. 19 illustrates a fifth variation of the embodiment of the present invention.

FIG. 19 illustrates a fifth variation of the embodiment of the present invention. In the fifth variation, the embodiment of the present invention is applied to a multi-level modulator. In this example, the optical modulator is an IQ modulator. That is, the optical modulator includes a set of Mach-Zehnder modulators 61 and 62 and a phase shifter 63. The Mach-Zehnder modulators 61 and 62 are provided in parallel to each other. That is, input light is guided to the Mach-Zehnder modulators 61 and 62. The Mach-Zehnder modulators 61 and 62 each generate a modulated optical signal. Then, the modulated optical signals generated by the Mach-Zehnder modulators 61 and 62 are combined. At this time, the phase shifter 63 gives a phase difference π/2 between the Mach-Zehnder modulators 61 and 62. Therefore, an IQ optical signal is generated.

Each of the Mach-Zehnder modulators 61 and 62 generates a PAM4 optical signal transmitting 2 bits per symbol. In the Mach-Zehnder modulator 61, a drive signal corresponding to an input signal in_lp/in_1n is provided to a modulation segment SS1-1, and an emphasis component generated based on the input signal in_lp/in_1n is provided to an emphasis segment SS1-2. Furthermore, a drive signal corresponding to an input signal in_2p/in_2n is provided to a modulation segment SS2-1, and an emphasis component generated based on the input signal in_2p/in_2n is provided to an emphasis segment SS2-2. Here, for example, the length of the modulation segment SS2-1 is preferably twice the length of the modulation segment SS1-1, and the length of the emphasis segment SS2-2 is preferably twice the length of the emphasis segment SS1-2. As a result, the PAM4 optical signal is generated. The Mach-Zehnder modulator 62 similarly generates a PAM4 optical signal. Then, the two PAM4 optical signals are combined. As a result, an optical signal in which each symbol transmits four bits is generated.

Figure 20:
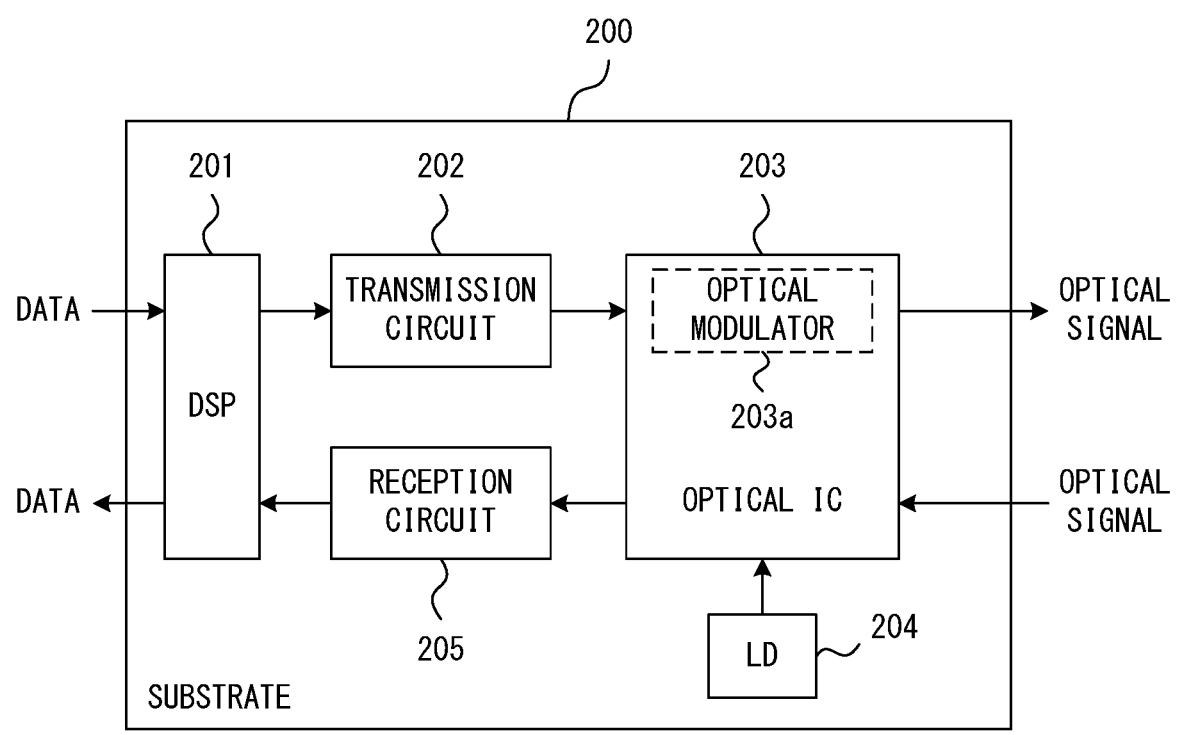
FIG. 20 illustrates an example of an optical transceiver in which the optical transmitter according to the embodiment of the present invention is implemented.

FIG. 20 illustrates an example of an optical transceiver in which the optical transmitter according to the embodiment of the present invention is implemented. The optical transceiver 200 includes a DSP chip 201, a transmission circuit chip 202, an optical integrated circuit chip 203, a light source (LD) 204, and a reception circuit chip 205. The DSP chip 201 generates a data signal indicating transmission data according to a specified modulation scheme. The transmission circuit chip 202 includes the drive circuit 100 illustrated in FIG. 4A and the like, and can generate a drive signal and an emphasis component signal from the data signal generated by the DSP chip 201. The optical integrated circuit chip 203 includes an optical modulator 203*a*, and modulates continuous wave light output from the light source 204 with the drive signal to which an emphasis component signal is added so as to generate a modulated optical signal. In addition, the optical integrated circuit chip 203 includes a coherent receiver (not illustrated) and generates an electric field information signal indicating a received optical signal. The reception circuit chip 205 recovers a bit string from the electric field information signal indicating the received optical signal. Subsequently, the DSP chip 201 performs decoding processing, error correction processing, and the like and reproduces the received data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter comprising:
an optical modulator that includes a Mach-Zehnder interferometer, a first phase shift segment, and a second phase shift segment, the first phase shift segment and the second phase shift segment each being configured to shift a phase of light propagating through an optical path of the Mach-Zehnder interferometer; and
a drive circuit that generates a drive signal for driving the first phase shift segment and the second phase shift segment, wherein
the drive circuit includes:
a first circuit that generates a first electric signal from an input signal indicating transmission data, as the drive signal; and
a second circuit that generates a second electric signal that emphasizes an edge of the first electric signal based on the input signal, as the drive signal,
the drive circuit provides the first electric signal to the first phase shift segment and provides the second electric signal to the second phase shift segment, the second circuit includes:
a delay circuit that generates a delay signal by delaying the input signal; and
a subtractor circuit that generates the second electric signal by subtracting the delay signal from the input signal, and
the second phase shift segment is connected in series to a capacitor provided between the subtractor circuit and the second phase shift segment.

2. The optical transmitter according to claim 1, wherein the second electric signal includes an overshoot component for a rising edge of the first electric signal and an undershoot component for a falling edge of the first electric signal.

3. The optical transmitter according to claim 1, wherein the first circuit is an amplifier circuit that generates the first electric signal by amplifying the input signal.

4. The optical transmitter according to claim 1, further comprising
an equalizer for adjusting a frequency characteristic of the second electric signal, the equalizer being provided between the second circuit and the second phase shift segment.

5. The optical transmitter according to claim 4, wherein the equalizer includes an inductor and the capacitor connected in series to the inductor.

6. The optical transmitter according to claim 1, wherein the first phase shift segment is terminated with a resistor and the second phase shift segment is terminated with an open stub.

7. An optical transmitter comprising:
an optical modulator that includes a Mach-Zehnder interferometer, a first phase shift segment, and a second phase shift segment, the first phase shift segment and the second phase shift segment each being configured to shift a phase of light propagating through an optical path of the Mach-Zehnder interferometer; and
a drive circuit that generates a drive signal for driving the first phase shift segment and the second phase shift segment, wherein
the drive circuit includes:
a first circuit that generates a first electric signal from an input signal indicating transmission data, as the drive signal; and
a second circuit that generates a second electric signal that emphasizes an edge of the first electric signal based on the input signal, as the drive signal,
the drive circuit provides the first electric signal to the first phase shift segment and provides the second electric signal to the second phase shift segment, and
the second circuit includes:
a delay circuit that delays the input signal to generate a first delay signal;
a second delay circuit that delays the first delay signal to generate a second delay signal; and
a subtractor circuit that generates, as the second electric signal, a signal obtained by subtracting the first delay signal from the input signal and a signal obtained by subtracting the second delay signal from the input signal.

8. An optical transmitter comprising:
an optical modulator that includes a Mach-Zehnder interferometer, a first phase shift segment, and a second phase shift segment, the first phase shift segment and the second phase shift segment each being configured to shift a phase of light propagating through an optical path of the Mach-Zehnder interferometer; and a drive circuit that generates a drive signal for driving the first phase shift segment and the second phase shift segment, wherein the drive circuit includes:
- a first circuit that generates a first electric signal from an input signal indicating transmission data, as the drive signal; and
- a second circuit that generates a second electric signal that emphasizes an edge of the first electric signal based on the input signal, as the drive signal,
- the drive circuit provides the first electric signal to the first phase shift segment and provides the second electric signal to the second phase shift segment, the input signal is a differential signal including a non-inverted signal and an inverted signal, and the second circuit includes:
- a delay circuit that delays the non-inverted signal and the inverted signal to generate a non-inverted delay signal and an inverted delay signal; and
- an addition circuit that generates the second electric signal by adding the inverted delay signal to the non-inverted signal and adding the non-inverted delay signal to the inverted signal.

9. An optical transmitter comprising:

an optical modulator that includes a Mach-Zehnder interferometer, a first phase shift segment, and a second phase shift segment, the first phase shift segment and the second phase shift segment each being configured to shift a phase of light propagating through an optical path of the Mach-Zehnder interferometer; and a drive circuit that generates a drive signal for driving the first phase shift segment and the second phase shift segment, wherein the drive circuit includes:
- a first circuit that generates a first electric signal from an input signal indicating transmission data, as the drive signal; and
- a second circuit that generates a second electric signal that emphasizes an edge of the first electric signal based on the input signal, as the drive signal,
- the drive circuit provides the first electric signal to the first phase shift segment and provides the second electric signal to the second phase shift segment, the input signal is a differential signal including a non-inverted signal and an inverted signal, and the second circuit includes:
- a delay circuit that delays the non-inverted signal and the inverted signal to generate a non-inverted delay signal and an inverted delay signal; and
- a logic circuit that generates, as the second electric signal, a first logical product signal indicating a logical product of the non-inverted signal and the inverted delay signal, a second logical product signal indicating a logical product of the inverted signal and the non-inverted delay signal, a first logical sum signal indicating a logical sum of the non-inverted signal and the inverted delay signal, and a second logical sum signal indicating a logical sum of the inverted signal and the non-inverted delay signal.

10. An optical transmitter comprising:

an optical modulator that includes a Mach-Zehnder interferometer, a first phase shift segment, and a second phase shift segment, the first phase shift segment and the second phase shift segment each being configured to shift a phase of light propagating through an optical path of the Mach-Zehnder interferometer; and a drive circuit that generates a drive signal for driving the first phase shift segment and the second phase shift segment, wherein the drive circuit includes:
- a first circuit that generates a first electric signal from an input signal indicating transmission data, as the drive signal; and
- a second circuit that generates a second electric signal that emphasizes an edge of the first electric signal based on the input signal, as the drive signal, the drive circuit provides the first electric signal to the first phase shift segment and provides the second electric signal to the second phase shift segment, and the first phase shift segment is terminated with a resistor and the second phase shift segment is terminated with an inductor and a capacitor connected in series to the inductor.

* * * * *